US009396151B2

(12) United States Patent
Harriman et al.

(10) Patent No.: US 9,396,151 B2
(45) Date of Patent: Jul. 19, 2016

(54) PCI EXPRESS TUNNELING OVER A MULTI-PROTOCOL I/O INTERCONNECT

(71) Applicant: INTEL CORPORATION, Santa Clara, CA (US)

(72) Inventors: David J. Harriman, Portland, OR (US); Maxim Dan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 5 days.

(21) Appl. No.: 14/301,100

(22) Filed: Jun. 10, 2014

(65) Prior Publication Data

US 2014/0344500 A1 Nov. 20, 2014

Related U.S. Application Data

(63) Continuation of application No. 13/369,140, filed on Feb. 8, 2012, now Pat. No. 8,782,321.

(51) Int. Cl.
*G06F 13/40* (2006.01)

(52) U.S. Cl.
CPC .... *G06F 13/4022* (2013.01); *G06F 2213/0026* (2013.01)

(58) Field of Classification Search
CPC ............... G06F 2213/0026; G06F 13/4022
USPC ................................. 710/316, 313
See application file for complete search history.

(56) References Cited

U.S. PATENT DOCUMENTS

| 4,767,168 A | 8/1988 | Grandy |
| 4,969,924 A | 11/1990 | Suverison et al. |
| 5,242,315 A | 9/1993 | O'Dea |
| 5,267,337 A | 11/1993 | Kirma |
| 5,419,717 A | 5/1995 | Abendschein et al. |

(Continued)

FOREIGN PATENT DOCUMENTS

| JP | 04-138677 A | 5/1992 |
| JP | 06-334687 A | 12/1994 |

(Continued)

OTHER PUBLICATIONS

International Search Report and Written Opinion received for International Application No. PCT/US2008/084621, mailed on May 18, 2009.

(Continued)

*Primary Examiner* — Glenn A Auve
(74) *Attorney, Agent, or Firm* — Schwabe, Williamson & Wyatt, P.C.

(57) ABSTRACT

Described are embodiments of methods, apparatuses, and systems for PCIe tunneling across a multi-protocol I/O interconnect of a computer apparatus. A method for PCIe tunneling across the multi-protocol I/O interconnect may include establishing a first communication path between ports of a switching fabric of a multi-protocol I/O interconnect of a computer apparatus in response to a peripheral component interconnect express (PCIe) device being connected to the computer apparatus, and establishing a second communication path between the switching fabric and a PCIe controller. The method may further include routing, by the multi-protocol I/O interconnect, PCIe protocol packets of the PCIe device from the PCIe device to the PCIe controller over the first and second communication paths. Other embodiments may be described and claimed.

17 Claims, 24 Drawing Sheets

(56) References Cited

U.S. PATENT DOCUMENTS

| | | | |
|---|---|---|---|
| 5,535,036 | A | 7/1996 | Grant |
| 6,108,782 | A | 8/2000 | Fletcher et al. |
| 6,272,551 | B1 | 8/2001 | Martin et al. |
| 6,478,625 | B2 | 11/2002 | Tolmie et al. |
| 6,536,670 | B1 | 3/2003 | Postman et al. |
| 6,549,966 | B1 | 4/2003 | Dickens et al. |
| 6,588,938 | B1 | 7/2003 | Lampert et al. |
| 6,751,238 | B1 | 6/2004 | Lipp et al. |
| 6,783,283 | B2 | 8/2004 | Nishita |
| 6,839,771 | B1 | 1/2005 | Bouchier et al. |
| 7,002,996 | B1 | 2/2006 | Dougherty et al. |
| 7,023,356 | B2 | 4/2006 | Burkhardt et al. |
| 7,069,369 | B2 | 6/2006 | Chou et al. |
| 7,081,023 | B2 | 7/2006 | Zhang et al. |
| 7,095,927 | B2 | 8/2006 | Yamada et al. |
| 7,171,505 | B2 | 1/2007 | Kulmann et al. |
| 7,184,440 | B1 | 2/2007 | Sterne et al. |
| 7,283,481 | B2 | 10/2007 | Huff |
| 7,330,468 | B1 | 2/2008 | Tse-Au |
| 7,412,544 | B2 | 8/2008 | Gibson et al. |
| 7,437,738 | B2 | 10/2008 | Shah et al. |
| 7,587,536 | B2 | 9/2009 | McLeod |
| 7,646,981 | B2 | 1/2010 | Coffey |
| 7,677,813 | B2 | 3/2010 | Anrig et al. |
| 7,734,172 | B2 | 6/2010 | Tse-Au |
| 8,051,217 | B2 | 11/2011 | Goodart et al. |
| 8,121,139 | B2 | 2/2012 | Sunaga et al. |
| 8,782,321 | B2 * | 7/2014 | Harriman ............ G06F 13/4022 370/466 |
| 2002/0049862 | A1 | 4/2002 | Gladney et al. |
| 2003/0126319 | A1 | 7/2003 | Adusumilli et al. |
| 2004/0246996 | A1 | 12/2004 | Engel |
| 2005/0281286 | A1 | 12/2005 | Wang et al. |
| 2006/0064522 | A1 | 3/2006 | Weigold et al. |
| 2006/0203851 | A1 | 9/2006 | Eidson |
| 2007/0005867 | A1 | 1/2007 | Diamant |
| 2007/0249193 | A1 | 10/2007 | Penumatcha et al. |
| 2008/0025289 | A1 | 1/2008 | Kapur et al. |
| 2008/0069150 | A1 | 3/2008 | Badt et al. |
| 2008/0150645 | A1 | 6/2008 | McCorquodale et al. |
| 2009/0106430 | A1 | 4/2009 | Matters et al. |
| 2009/0172185 | A1 | 7/2009 | Chandra et al. |
| 2010/0049885 | A1 | 2/2010 | Chandra et al. |
| 2010/0085989 | A1 | 4/2010 | Belhadj et al. |
| 2010/0135314 | A1 | 6/2010 | Fourcand |
| 2010/0211834 | A1 | 8/2010 | Asnaashari et al. |
| 2011/0052199 | A1 | 3/2011 | Beshai |
| 2011/0182274 | A1 | 7/2011 | Lam et al. |
| 2013/0166798 | A1 * | 6/2013 | Chandra ............ G06F 13/4081 710/105 |

FOREIGN PATENT DOCUMENTS

| | | |
|---|---|---|
| JP | 10-233820 | 9/1998 |
| JP | 10-243016 A | 9/1998 |
| JP | 2001-168380 A | 6/2001 |
| JP | 2001-358733 | 12/2001 |
| JP | 2002-190344 A | 7/2002 |
| JP | 2006-115362 A | 4/2006 |
| KR | 10-2001-0076079 | 8/2001 |
| TW | 1249313 B | 2/2006 |
| WO | 2009/085494 | 7/2009 |
| WO | 2010/021844 | 2/2010 |

OTHER PUBLICATIONS

International Preliminary Report on Patentability for International Application No. PCT/US2008/084621, mailed on Jul. 8, 2010.
International Search Report/Written Opinion for International Application No. PCT/US2009/052831, mailed on Mar. 15, 2010.
International Preliminary Report on Patentability and Written Opinion received for International Application No. PCT/US2009/052831, Mailed on Mar. 3, 2011.
Office Action for Taiwan Application No. 97147418, mailed Jun. 14, 2012.
Search Report for European Application No. 09808593.9, mailed on Aug. 19, 2011.
Office Action for European Application No. 09808593.9, mailed Sep. 13, 2011.
Search Report for European Application No. 08868735.5, mailed on Sep. 2, 2011.
Office Action for European Application No. 08868735.5, mailed on mailed Sep. 29, 2011.
Office Action for Korean Application No. 10-2010-7016587, mailed Jul. 11, 2011.
Office Action for Korean Application No. 10-2010-7016587, mailed Apr. 26, 2012.
Office Action for Japanese Application No. 2010-540703, mailed Nov. 22, 2011.
Office Action for Chinese Application No. 200880122959.5, mailed Mar. 19, 2012.
Final Office Action for U.S. Appl. No. 11/964,666 mailed Jan. 24, 2011.
Notice of Allowability for U.S. Appl. No. 11/964,666 mailed Apr. 12, 2012.
Notice of Allowance for U.S. Appl. No. 11/964,666 dated Nov. 23, 2012.
Non-Final Office Action for U.S. Appl. No. 12/229,453 mailed Dec. 29, 2010.
Non-final Office Action for U.S. Appl. No. 12/229,453 mailed Jun. 23, 2010.
Non-Final Office Action for U.S. Appl. No. 12/229,453 mailed Jun. 15, 2011.
Final Office Action for U.S. Appl. No. 12/229,453 mailed Nov. 7, 2011.
Non-Final Office Action for U.S. Appl. No. 12/229,453 mailed Mar. 28, 2012.
Final Office Action for U.S. Appl. No. 12/229,453 mailed Oct. 10, 2012.
Advisory Action for U.S. Appl. No. 12/229,453 mailed Dec. 13, 2012.
Non-Final Office Action for U.S. Appl. No. 12/229,453, mailed Jun. 28, 2013.
Non-Final Office Action for U.S. Appl. No. 13/338,236, mailed Jul. 1, 2013.
Office Action and Search Report issued for Taiwan Application No. 97147418, mailed Nov. 22, 2012.
Office Action for JP 2011-523856, mailed Mar. 12, 2013.
Third Office Action for CN 200880122959.5 mailed Mar. 27, 2013.
Office Action for CN 200980136965.0 mailed Apr. 27, 2013.
Office Action for Taiwan Application No. 98127253, mailed Nov. 12, 2012.
Office Action for Korean Application No. 10-2011-7003986, mailed Jul. 18, 2012.
Office Action for Chinese Application No. 200880122959.5, mailed Dec. 3, 2012.
International Search Report & Written Opinion for PCT/US2012/067393 mailed Mar. 8, 2013.
International Search Report & Written Opinion for PCT/US2012/067438 mailed Mar. 11, 2013.
Non-Final Office Action for U.S. Appl. No. 11/964,666 mailed Aug. 11, 2010.
International Search Report & Written Opinion for PCT/US2012/067439, mailed Mar. 5, 2013.
Office Action mailed Feb. 5, 2014 for Korean Application No. 2013-0014284, 3 pages.
Office Action mailed Jan. 13, 2014 for Chinese Application No. 200980136965.0, 15 pages.

* cited by examiner

PRIOR ART

PRIOR ART

PRIOR ART

PRIOR ART

PRIOR ART

00000011b : Marks start of EDB

PCI EXPRESS TUNNELING OVER A MULTI-PROTOCOL I/O INTERCONNECT

CROSS REFERENCE TO RELATED APPLICATIONS

This application is a continuation of and claims priority under 35 U.S.C. §120 to U.S. patent application Ser. No. 13/369,140, filed Feb. 8, 2012, entitled "PCI EXPRESS TUNNELING OVER A MULTI-PROTOCOL I/O INTERCONNECT" assigned to the same assignee as the present application, and incorporated herein by reference in its entirety.

TECHNICAL FIELD

Embodiments of the present disclosure relate generally to PCI express tunneling over a multi-protocol I/O interconnect of a computer apparatus.

BACKGROUND

Conventional computer platform architectures include a variety of host controllers to implement a number of different types of I/O between computer platforms and peripheral devices that are connected to the platforms, and these computer platforms generally include protocol-specific connection interfaces that connect to the peripheral devices via protocol-specific plugs and cables. For example, a computer may include one or more of a USB-specific controller that connects to a peripheral device via a USB-specific connection interface, a display-specific controller (e.g., DisplayPort) that connects to a peripheral device via a display-specific connection interface, a PCI express (PCIe)-controller that connects to a peripheral device via a PCIe-specific connection interface, and so on.

BRIEF DESCRIPTION OF THE DRAWINGS

Embodiments of the present disclosure will be described by way of example embodiments, but not limitations, illustrated in the accompanying drawings in which like references denote similar elements, and in which:

FIG. 8 describes a format of a route string for routing configuration packets in a domain, in accordance with various embodiments of the present disclosure.

FIG. 9 describes a format of a topology ID configuration register, in accordance with various embodiments of the present disclosure.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Figure 1:
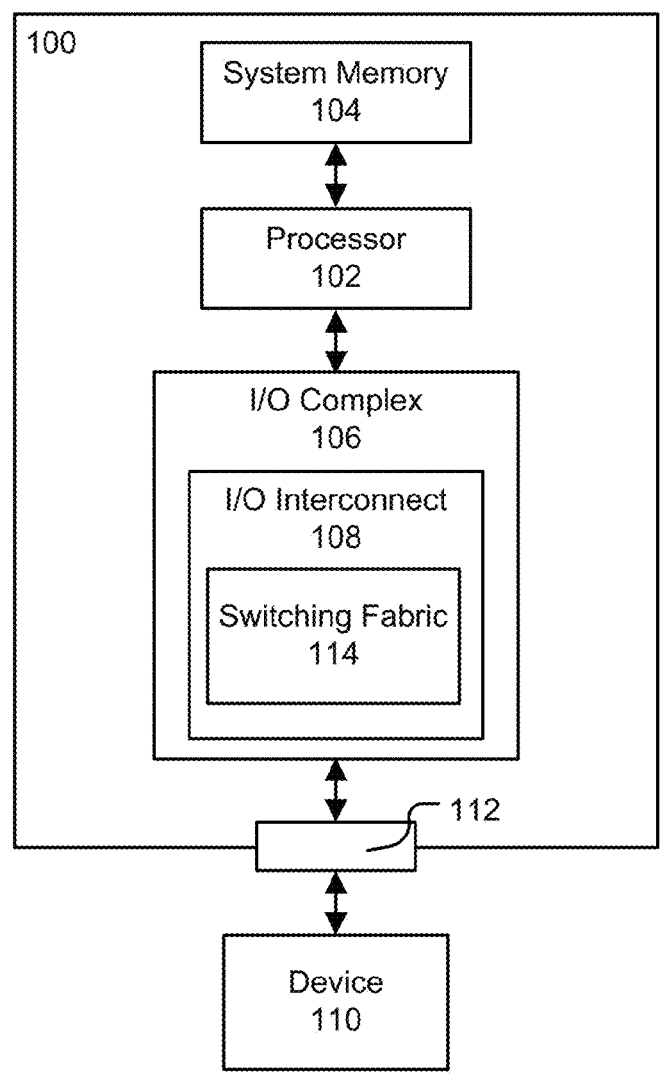
FIG. 1 describes a computer apparatus including a multi-protocol tunneling I/O interconnect, in accordance with various embodiments of the present disclosure.

FIG. 1 describes a computer apparatus 100 including a multi-protocol tunneling I/O interconnect 108 in accordance with various embodiments. In many embodiments, the computer apparatus 100 may include one or more processors 102. In different embodiments, the one or more processors 102 may include one core or multiple cores. In some embodiments, the apparatus 100 may be a multiprocessor system (not shown) where each of the processors has one core or multiple cores.

As shown in FIG. 1, the one or more processors 102 may be operatively coupled to system memory 104 through one or more links (e.g., interconnects, buses, etc). System memory 104 may be capable of storing information that the one or more processors 100 utilize to operate and execute programs and operating systems. In different embodiments, system memory 104 may be any usable type of readable and writeable memory such as a form of dynamic random access memory (DRAM).

In previously implemented computer apparatuses, an I/O link connecting a peripheral device to a computer system is protocol-specific with a protocol-specific connector port that allows a compatible peripheral device to be attached to the protocol-specific connector port (i.e., a USB keyboard device would be plugged into a USB port, a router device would be plugged into a LAN/Ethernet port, etc.) with a protocol-specific cable. Any single connector port would be limited to peripheral devices with a compatible plug and compatible protocol. Once a compatible peripheral device is plugged into the connector port, a communication link would be established between the peripheral device and a protocol-specific controller.

In the computer apparatus as described in the embodiment shown in FIG. 1, the one or more processors 102 may be operatively coupled to an I/O complex 106, which may house one or more multi-protocol I/O interconnects 108 configured to control one or more I/O links that allow the one or more processors 102 to communicate with one or more I/O peripheral devices 110. For providing the multi-protocol capability, at least in part, the I/O interconnect 108 may include a multi-protocol switching fabric 114 configured to carry multiple I/O protocols. In various embodiments, the multi-protocol switching fabric 114 may comprise a plurality of cross-bar switches. Examples of I/O peripheral devices 110 may include a display device, a keyboard device, an expansion port, a desktop or mobile computer system, or a router, among other devices.

A non-protocol-specific connector port 112 may be configured to couple the I/O interconnect 108 with a connector port (not shown) of the device 110, allowing multiple device types to attach to the computer system 100 through a single physical connector port 112. Moreover, the I/O link between the device 110 and the I/O complex 106 may be configured to carry multiple I/O protocols (e.g., PCIe, USB, DisplayPort, HDMI®, etc.) simultaneously. In various embodiments, the connector port 112 may be capable of providing the full bandwidth of the link in both directions with no sharing of bandwidth between ports or between upstream and downstream directions. In various embodiments, the connection between the I/O interconnect 108 and the device 110 may support electrical connections, optical connections, or both.

Figure 2:
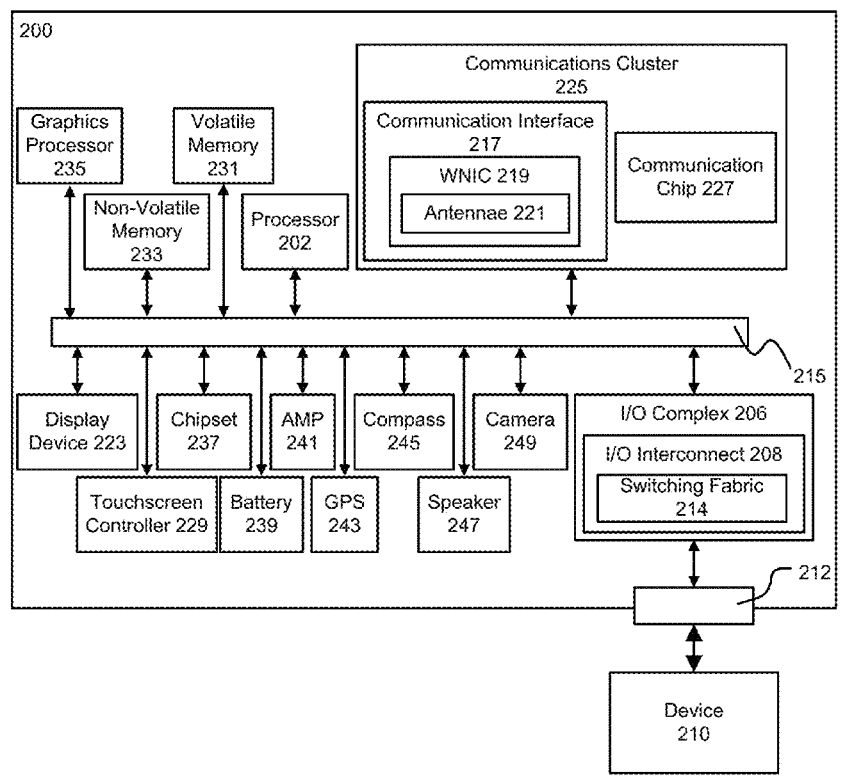
FIG. 2 describes a computer system including a multi-protocol tunneling I/O interconnect, in accordance with various embodiments of the present disclosure.

The apparatus 100 may be a stand-alone device or may be incorporated into various systems including, but not limited to, various computing and/or consumer electronic devices/appliances. A block diagram of an example system 200 is illustrated in FIG. 2. The system 200 may comprise one or more processor(s) 202, system memory 204, and an I/O complex 206, all operatively coupled by a bus 115. The I/O complex 206 may include one or more multi-protocol I/O interconnects 208, each of which include a switching fabric 214 and control one or more I/O links that allow the one or more processors 202 to communicate with one or more I/O peripheral devices 210. In various embodiments, the system 200 may have more or fewer components, and/or different architectures.

In various implementations, the system 200 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 200 may be any other electronic device that processes data.

The system 200 may include a communications cluster 225 operatively coupled to the bus 215 to facilitating communication of the system 200 over one or more networks and/or with any other suitable device. The communications cluster 225 may include at least one communication chip 227, at least one communication interface 217, and at least one display device 223. In some implementations the at least one communication chip 227 may be part of the processor 202.

In various embodiments, the system 200 may house a mother board (not illustrated) with which the processor 202 and/or the communication chip 227 may be physically and electrically coupled.

Depending on its applications, the system 200 may include other components that may or may not be physically and electrically coupled to the mother board. These other components include, but are not limited to, volatile memory 231 (e.g., DRAM), non-volatile memory 233 (e.g., ROM), flash memory, a graphics processor 235, a digital signal processor, a crypto processor, a chipset 237, a battery 239, an audio codec, a video codec, a power amplifier 241, a global positioning system (GPS) device 243, a compass 245, an accelerometer, a gyroscope, a speaker 247, a camera 249, and a mass storage device (such as hard disk drive, compact disk (CD), digital versatile disk (DVD), and so forth).

The communication chip 227 may enable wireless communications for the transfer of data to and from the system 200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 227 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. The system 200 may include a plurality of communication chips 227. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The communication interface 217 may provide an interface for system 200 to communicate over one or more networks and/or with any other suitable device. The communications interface(s) 217 may include any suitable hardware and/or firmware. The communications interface(s) 217 for one embodiment may include, for example, a network adapter, a wireless network adapter, a telephone modem, and/or a wireless modem. For wireless communications, the communications interface(s) 217 for one embodiment may include a wireless network interface controller 219 having one or more antennae 221 to establish and maintain a wireless communication link with one or more components of a wireless network. The system 200 may wirelessly communicate with the one or more components of the wireless network in accordance with any of one or more wireless network standards and/or protocols.

The system 100 may include a display device 223, such as, for example, a cathode ray tube (CRT), liquid crystal display (LCD), light emitting diode (LED), or other suitable display device, operatively coupled to the bus 215 for displaying information. The display device 223 may be a touch screen display supporting touch screen features, and in various one of these embodiments, the system 200 may include a touch-screen controller 229. In various embodiments, the display device 223 may be a peripheral device interconnected with the system 200. In various embodiments, a peripheral display device may be interconnected with the I/O complex 206 by way of the multi-protocol port 212.

The processor 202 of the system 200 may include an integrated circuit die packaged within the processor 202. In some implementations, the integrated circuit die of the processor 202 may include one or more devices, such as transistors or metal interconnects. The term "processor" may refer to any device or portion of a device that processes electronic data from registers and/or memory to transform that electronic data into other electronic data that may be stored in registers and/or memory. The communication chip 227 may also include an integrated circuit die packaged within the communication chip 227.

Figure 3:
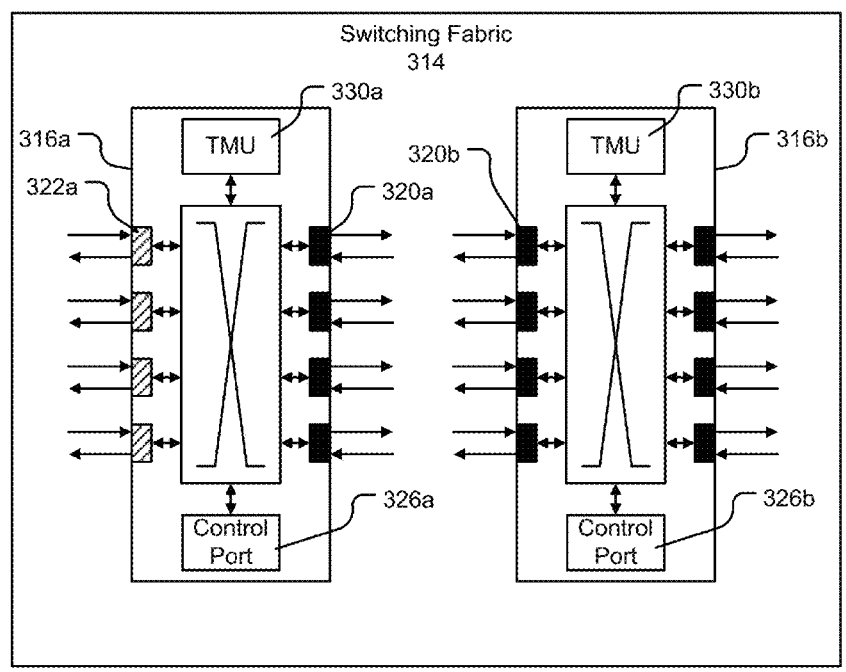
FIG. 3 describes a switching fabric of a multi-protocol tunneling I/O interconnect, in accordance with various embodiments of the present disclosure.

As described herein, for providing an I/O interconnect capable of carrying multiple I/O protocols, one or more of the various I/O interconnects described herein may include, among other things, a multi-protocol switching fabric 314 comprising a plurality of cross-bar switches, as shown in FIG. 3. The multi-protocol switching fabric 314 may be similar to other multi-protocol switching fabrics described herein. In general, the switches 316a, 316b are devices comprising multiple ports 320s, 320b, 322a with the ability to route a packet from any input port to any output port. In various embodiments, the switches 316a, 316b may comprise any number of ports 320s, 320b, 322a, with each additionally including an internal control port 326a, 326b. The switches 316a, 316b may each optionally include a time management unit 330a, 330b for use in distributing and synchronizing time throughout the multi-protocol switching fabric 314, as described more fully herein.

Switch 316a may represent a first type of switch including null ports 320a configured to connect to a single optical or electrical link, while adapter ports 322a may be configured to connect to one or more mapped I/O protocol links. The adapter ports 322a may be used to connect mapped I/O protocol entities to the multi-protocol switching fabric 314. As used herein, the term "adapter" may be used to refer to the protocol adaptation function that may be built into the switch port to encapsulate the mapped I/O protocol packets into I/O packets that flow over the multi-protocol switching fabric 314.

Switch 316b may represent a second type of switch including only null ports 320b (like null ports 320a) configured to connect to a single optical or electrical link.

Although the switches 316a, 316b depicted in FIG. 3 each include four adapter ports 322a and four null ports 320a, 320b, the actual number of ports 320a, 320b, 322a may be fewer or more than that shown. In order to provide connectivity between switches 316a, 316b, a switch implementation generally minimally includes either at least one null port and at least one adapter port, or at least two null ports.

In various embodiments, the multi-protocol switching fabric 314 may comprise one or more of the first type of switches 316a and one or more of the second type of switches 316b.

For implementing various multi-protocol tunneling between adapter ports of a switching fabric within the scope of the present disclosure, a connection manager (not illustrated) may be provided. The connection manager may be implemented in software, firmware, as logic within an I/O complex, as part of a system BIOS, or within an operating system running on a computer apparatus or system in which the I/O complex is included.

Figure 4:
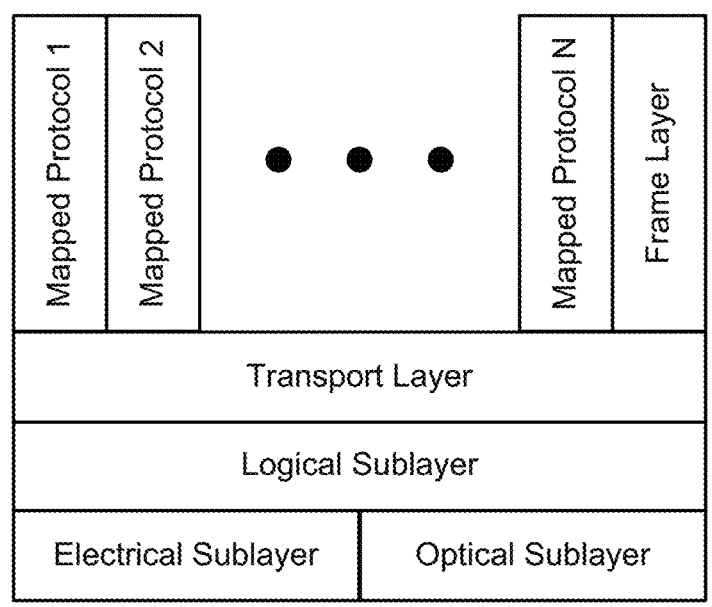
FIG. 4 describes a protocol stack for a multi-protocol I/O interconnect architecture of an I/O complex, in accordance with various embodiments of the present disclosure.

An example protocol stack for the multi-protocol I/O interconnect architecture of an I/O complex is shown in FIG. 4. The electrical and optical sublayers, the logical sublayer, the transport layer, and the frame layer may define the base multi-protocol I/O interconnect architecture of the I/O complex, in which the physical layer comprises the electrical, optical, and logical sublayers. The mapped protocol layers may describe the mapping of the specific I/O protocols onto the multi-protocol I/O interconnect architecture.

In various embodiments, and with reference to FIG. 3 and FIG. 4, the transport layer may be implemented by all ports 320a, 320b, 322a of the switches 316a, 316b of the multi-protocol switching fabric 314, the physical layer may be implemented by all null ports 320a, 320b, and the adapter ports 322a may implement a single mapped protocol layer or the frame layer.

Figure 5:
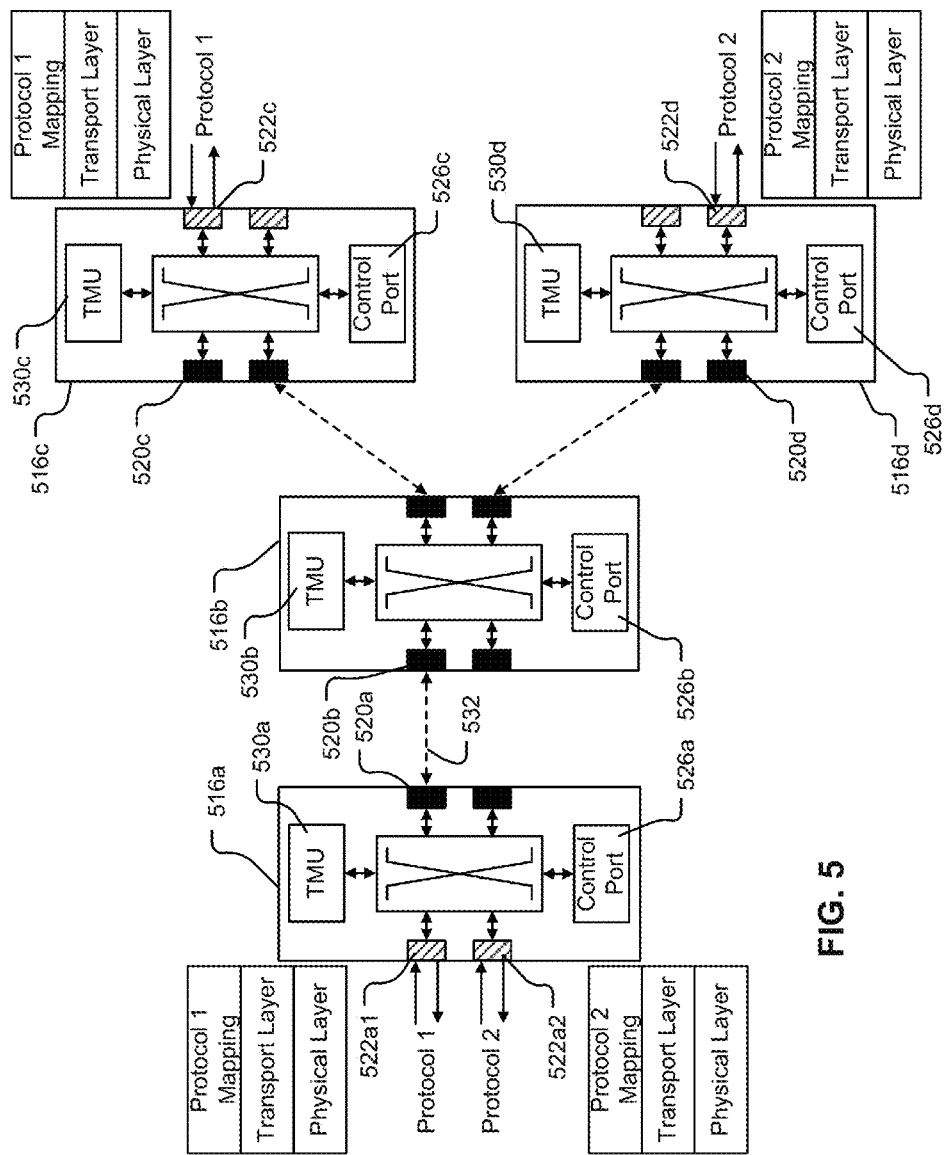
FIG. 5 describes an implementation of a protocol stack for a multi-protocol I/O interconnect architecture of an I/O complex, in accordance with various embodiments of the present disclosure.

An example implementation of the protocol layering is shown in FIG. 5. In the example shown, two protocols are implemented using switches 516a, 516b, 516c, 516d. Each of the switches 516a, 516b, 516c, 516d include control ports 526a, 526b, 526c, 526d, and time management units 530a, 530b, 530c, 530d.

As shown, the adapter ports 522a1, 522c implement a first protocol layer (or frame layer) "protocol 1," and adapter ports 522a2, 522d implement a second protocol layer (or frame layer) "protocol 2." All ports implement the transport layer, while the physical layer is implemented by all null ports 520a, 520b, 520c, 520d.

As such, a link (e.g., link 532) between ports of switches may effectively be shared by multiple paths traversing the fabric between adapter ports of the multi-protocol switching fabric. In various embodiments, the multi-protocol I/O interconnect architecture may be connection-oriented such that a path is configured end-to-end before data transfer takes place. The path may traverse one or more links through the multi-protocol switching fabric, and each hop, the path may be assigned a locally unique identifier (e.g., Hop ID) that may be carried in the header of all the packets that are associated with the path. In various embodiments, packets belonging to the path may not be reordered within the multi-protocol switching fabric. Buffer allocation (flow control) and Quality of Service may be implemented on a per-path basis. As such, a path may provide virtual-wire semantics for a mapped I/O protocol across the multi-protocol switching fabric.

Figure 6A:
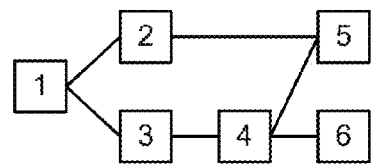
FIG. 6A describes a physical topology of a domain of switches, and FIG. 6B describes an embodiment of a spanning tree for managing the domain of FIG. 6A, in accordance with various embodiments of the present disclosure.
Figure 6B:
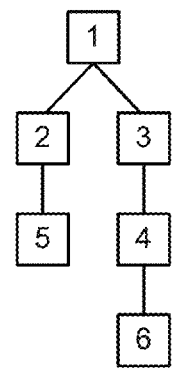

In various embodiments, the physical topology of a collection of switches (a domain) may be an arbitrarily interconnected graph. FIG. 6A shows an example of a physical topology of a domain of switches 1-6. It should be noted that a domain is a management concept rather than an operational one. In various embodiments, a connection manager, as described earlier, may configure the domains of a switching fabric. For further management purposes, a multi-protocol apparatus may be configured to create a spanning tree (by way of the connection manager, for example). FIG. 6B shows an example spanning tree created for managing the domain of FIG. 6A in which the switch 1 at the top of the spanning tree may be referred to as the root switch. It is noted that a spanning tree may include any suitable number of levels. In various embodiments, the maximum number of levels of the spanning tree may be seven.

Figure 7:
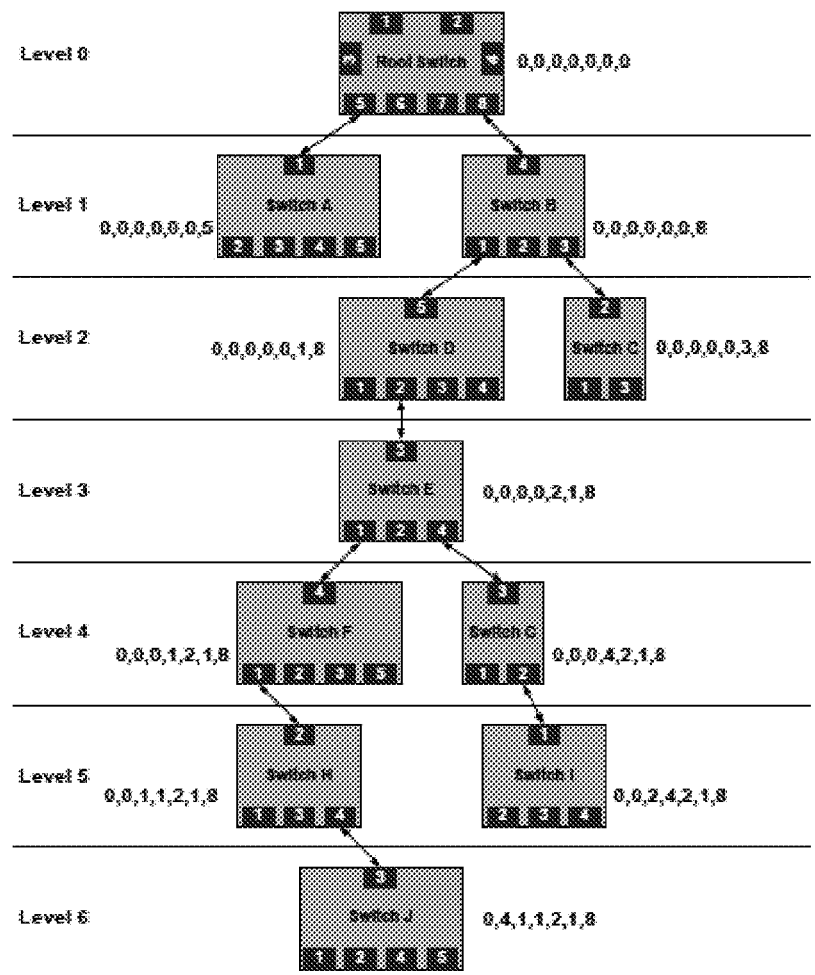
FIG. 7 describes a spanning tree in a domain, in accordance with various embodiments of the present disclosure.

FIG. 7 shows an example of a spanning tree in a domain. Also shown are example assignments of unique topology IDs to each of the switches in the domain. For example, switch J has a topology ID of 0,4,1,1,2,1,8. In various embodiments, unique topology IDs may be assigned to every switch of a domain and each topology ID may represent the position of the switch within the spanning tree of the domain. In various embodiments, the assignment of the topology IDs may be done by the connection manager during initialization in which the domains may be created by enumerating the switches that are reachable and the topology IDs may be assigned for each switch.

As shown in FIG. 7, the domain includes seven levels (levels 0-6), and the topology IDs of each of the switches are sequences of seven port numbers representing the egress ports at each level of the tree on the path, from the root switch to itself. The topology ID of a switch at a depth of X (where X is from 0 to 6 in this example) may contain a non-zero port number for levels 0 to X−1. The port number at depth X may be 0 denoting the control port of the switch at depth X. The port numbers from depth X+1 to 6 may be treated as "don't care" and may be set at 0. Thus, in the example shown, the control port at the root switch has a topology ID of 0,0,0,0,0,0,0.

Figures 8, 9:
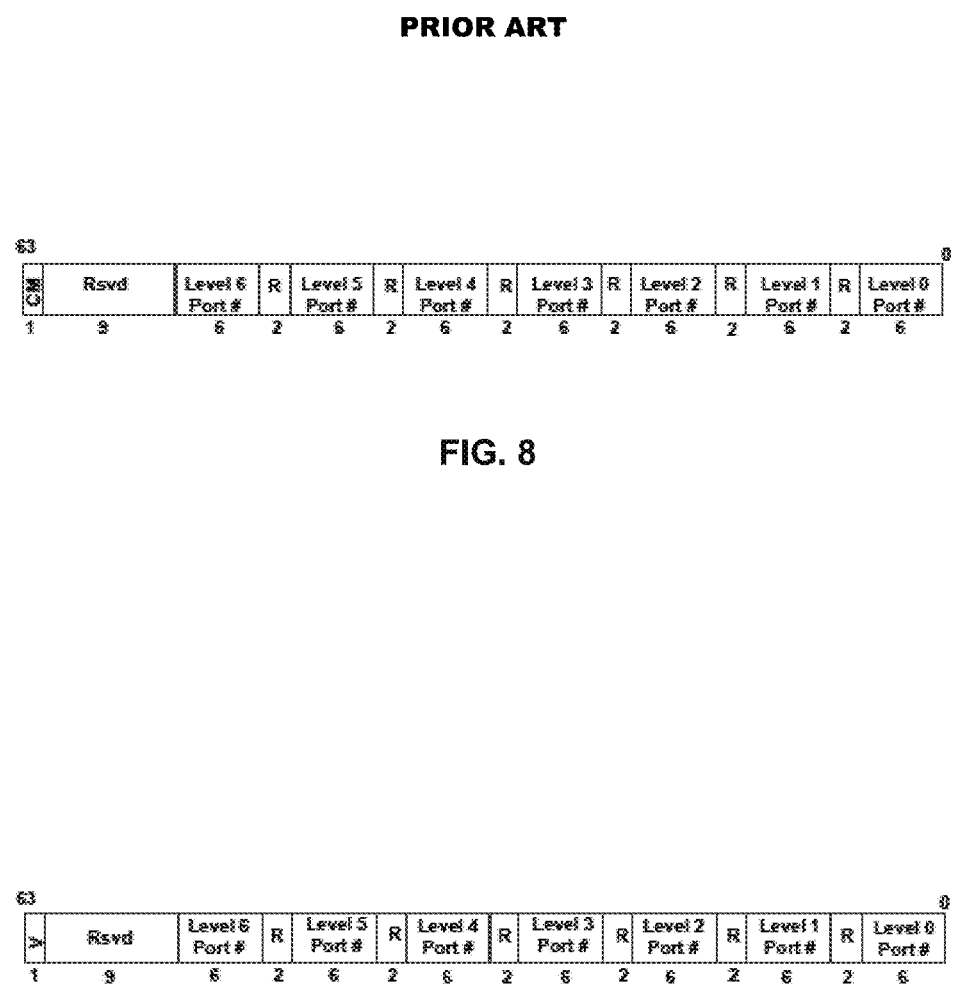

In various embodiments, the routing of configuration packets flowing downstream (in relation to the spanning tree) may be based on the topology ID of the target switch. The configuration packets may be routed in the transport layer packet header. In various embodiments, configuration packets flowing upstream may not use the topology ID and may simply be forwarded over the upstream port of each switch. Typically, every configuration packet carries a route string included in its payload. An example format of the route string is shown in FIG. 8. As shown, the route string may essentially be the topology ID of the switch to which the configuration request is sent or from which the configuration response originates. The MSB bit (CM bit) of the route string may be set to 0 when the configuration message is flowing downstream (from the connection manager to the switch) and set to 1 if the message is flowing in the upstream direction.

In various embodiments, each switch may be configured with its topology ID and its level in the spanning tree by the connection manager. Each switch may also be configured with the port number that points upstream to the connection manager of the domain either through hardware strapping or other similar mechanisms. In various embodiments, the topology ID, depth (in the tree), and upstream facing port may be configuration registers in the switch configuration space of every switch that are initialized by the connection manager during enumeration. An example format of the topology ID configuration register is shown in FIG. 9. For the illustrated example, the MSB of the topology ID may be a valid flag, which may be set to 0 on reset and set to 1 by the connection manager when the topology ID is initialized. The reserved bits of the topology ID may be set to 0.

Configuration packets flowing down the tree may be routed by the control port of a switch in accordance with one or more rules. For example, in various embodiments, the control port of the switch may be required to extract the port from the route string that corresponds to its configured level in the tree. In various embodiments, if the port is 0, the control port may be required to consume the packet. In various embodiments, if the port is non-zero, the control port may be required to forward the packet over the switch port that matches the port extracted from the route string. In various embodiments, configuration packets flowing up the spanning tree may simply be forwarded over the configured upstream facing port.

Figure 10:
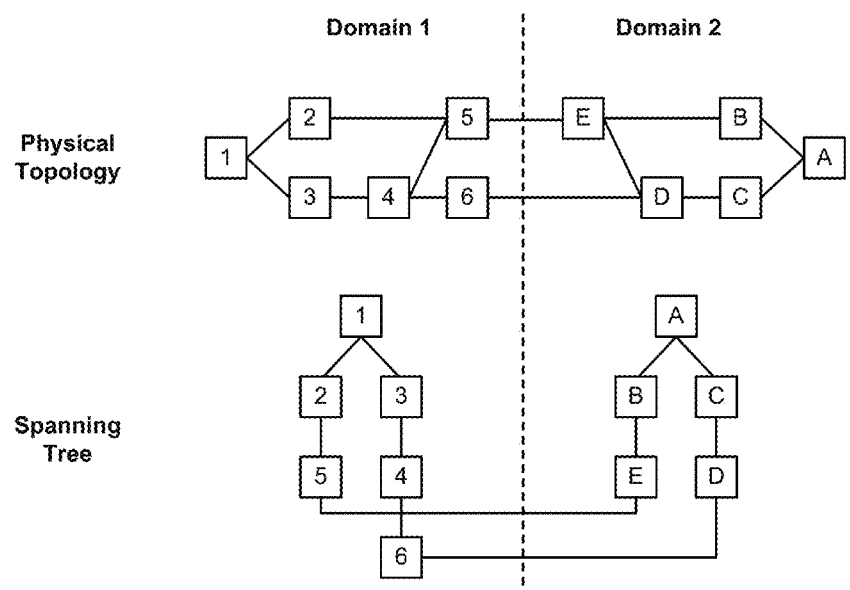
FIG. 10 describes connections that may be established between multiple domains, in accordance with various embodiments of the present disclosure.

Multiple domains may interconnected in various embodiments. FIG. 10 shows example connections that may be established between multiple domains. As shown, switches 1-6 of Domain 1 may be interconnected with switches A-E of Domain 2.

In various embodiments, inter-domain links may be discovered either when the connection manager performs the initial discovery of the topology following power-on or by processing a hot-plug event. A link may be designated to be an inter-domain link when a read of the switch configuration space of the switch across the link results in an ERROR packet being sent that shows that the topology ID field has been previously assigned. When an inter-domain link is discovered, the connection manager may notify system software. The mechanism used to deliver the notification may be implementation-defined.

In various embodiments, the transport layer may only define the routing of inter-domain configuration packets between the two connection managers of the domains that are connected by an inter-domain link. Routing of configuration packets across multiple domains may be controlled by system software. When domains are daisy-chained, configuration packets passing from the originating domain may be delivered to the connection managers of every domain along the path to the target domain. The connection managers of the intermediate domains may pass the configuration packets to the system software which may be responsible for relaying the packet across the inter-domain link towards the target domain.

The routing of inter-domain REQUEST packets may be in accordance with one or more rules. For example, in various embodiments, system software on the originating domain may form REQUEST packet with a route string that points to the egress port of the domain that connects to the inter-domain link over which the packet must be forwarded and the CM bit may be set to 0. The packet may be required to be routed based on the route string at each hop within the domain and forwarded over the egress port across the inter-domain link. At the ingress port of the receiving domain, the control port may remap the route string to point to the ingress port over which the packet was received and the CM bit may be set to 1. In various embodiments, the packet may then be required to be routed to the connection manager of the receiving domain like other intra-domain configuration packets. The packet may be required to be delivered by the connection manager of the receiving domain to system software.

The routing of inter-domain RESPONSE packets may follow one or more of the same steps above. In various embodiments, system software that constructs the RESPONSE packet may use the route string in the corresponding REQUEST packet with the CM bit set to 0.

In various embodiments, the transport layer may employ a hierarchical, credit-based flow control scheme with respect to flow through the multi-protocol switching fabric to prevent or minimize overflow of receive buffers due to congestion. In various embodiments, the flow control scheme may allow a receiver to implement various buffer allocation strategies ranging from dedicated buffers per-path to shared buffer pools that are dynamically shared by multiple paths. In various embodiments, flow control may be turned off on a per-path basis. When flow control is turned off for a path, the path may be required to be provisioned with a receive buffer that can hold at least one maximum sized transport layer packet at each link.

Figure 11:
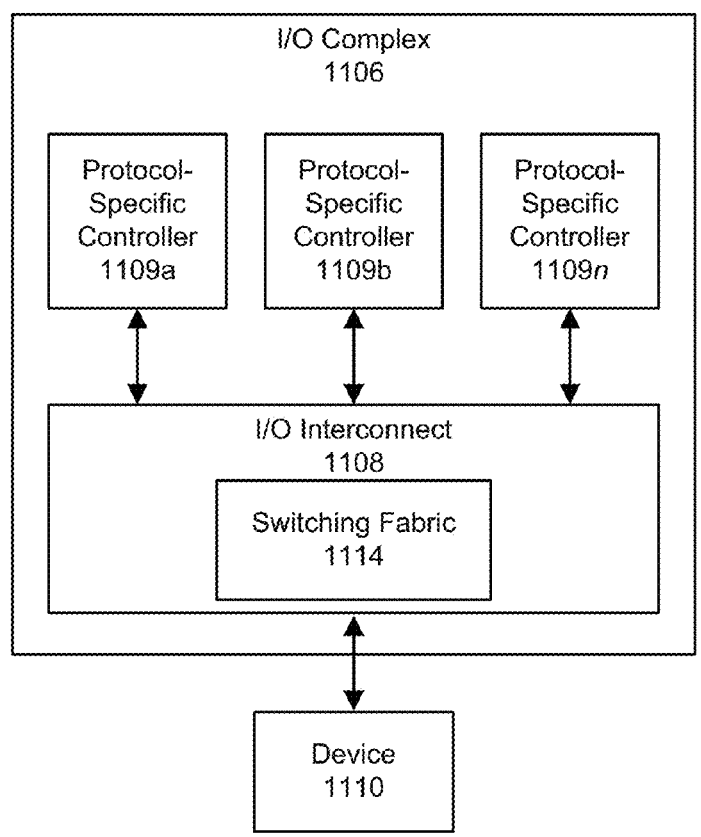
FIG. 11 describes a multi-protocol tunneling I/O complex and interconnect, in accordance with various embodiments of the present disclosure.

FIG. 11 shows an example I/O complex 1106 in accordance with various embodiments. I/O complex 1106 may be similar to the I/O complex 106 of FIG. 1, including an I/O interconnect 1108 configured to couple with a device 1110. The device 1110 may be configured with one or more I/O protocols (e.g., PCIe, USB, DisplayPort, HDMI®, etc.).

In various embodiments, the I/O complex 1106 may be configured to connect the device 1110 with one or more protocol-specific controllers 1109a, 1109b, . . . 1109n via the I/O interconnect 1108 in order to tunnel multiple I/O protocols over a common link in a manner that is transparent to the OS software stacks of tunneled I/O protocols. The protocol-specific controllers 1109a, 1109b, . . . 1109n may be configured to then communicate with respective protocol-specific drivers in the OS for configuring the device 1110 as if the device 1110 was directly connected with the protocol-specific controller 1109a, 1109b, . . . 1109n.

Figure 12:
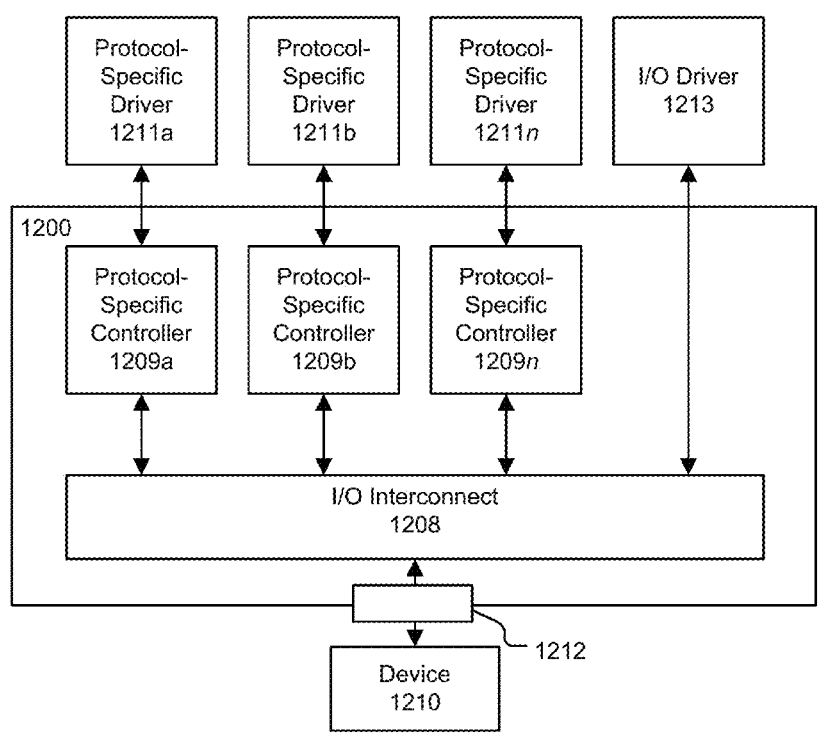
FIG. 12 describes a multi-protocol tunneling I/O complex and interconnect, in accordance with various embodiments of the present disclosure.

FIG. 12 shows an example hardware and software implementation of a multi-protocol apparatus (such as apparatus 100 of FIG. 1, for example) configured to tunnel multiple I/O protocols over a common link in a manner that is transparent to operating system software stacks of tunneled I/O protocols. In various embodiments, a multi-protocol apparatus may employ a multi-level hot-plug signaling scheme to support the tunneling of multiple I/O protocols over a common interconnect in a software-transparent manner.

For the implementation shown in FIG. 12, an I/O hot-plug indication may be sent by the I/O interconnect 1208 to the I/O driver in the OS (or to embedded I/O firmware) when the device 1210 is plugged into the non-protocol-specific connector port 1212 of the apparatus 1200. The hot-plug indication may then be processed by the I/O driver 1213 in the OS/firmware, resulting in communication path(s) being established between the I/O interconnect 708 and the device 1210. In various embodiments, establishing communication path(s) may include configuring one or more paths between a source adapter and a destination adapter in a domain (described more fully elsewhere). Once the path(s) are established, mapped I/O protocol-specific configuration may be performed in which a protocol-specific hot-plug indication may be sent by the associated protocol-specific controller 1209a, 1209b, . . . 1209n to the respective protocol-specific driver 1211a, 1211b, . . . 1211n in the OS/firmware. The protocol-specific driver 1211a, 1211b, . . . 1211n may then configure the associated protocol-specific controller 1209a, 1209b, . . . 1209n as if the device 1210 was directly connected with the protocol-specific controller 1209a, 1209b, . . . 1209n. At this point, the peripheral device 1210 may be visible to system software and configured to be used by applications.

In various embodiments, the apparatus 1200 may be configured such that when the device 1210 is disconnected from the port 1212, a reverse sequence of events may occur. Specifically, the protocol-specific drivers 1211a, 1211b, . . . 1211n may process the protocol-specific unplug event, and then after the protocol-specific processing, the I/O driver 1213 may process the I/O unplug event.

Peripheral devices described herein (device 110, 210, 1110, or 1210, for example) may be any one of various types of devices, as noted earlier. In various embodiments, the peripheral device may be an expansion port (or other multi-protocol peripheral device) with which one or more other devices, with one or more I/O protocols, may be coupled. For example, for embodiments in which the peripheral device is an expansion port, the device may be simultaneously coupled with a PCIe device and a DisplayPort device, which may be coupled with an I/O complex through the expansion port device. In another example, the peripheral device may be a mobile or desktop computer system and one or more other devices may be coupled with the mobile or desktop computer system and with the I/O complex through the device. In various embodiments, multiple peripheral devices may be coupled together by daisy chaining the devices together.

Figure 13:
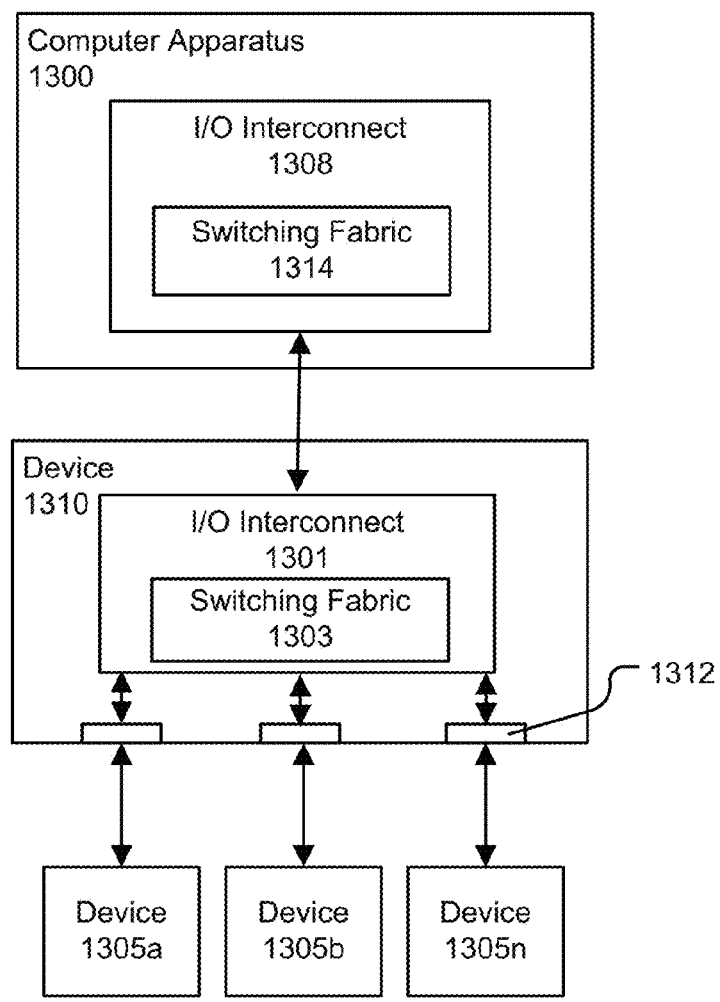
FIG. 13 describes a device (e.g., a peripheral device) including a multi-protocol tunneling I/O interconnect connected with a multi-protocol tunneling I/O interconnect of a computer apparatus, both in accordance with various embodiments of the present disclosure.

In various embodiments, the peripheral device and/or the other devices coupled with the peripheral device may also include an I/O interconnect similar to one or more of the I/O interconnects 108, 208, 1108, 1208 described herein. As shown in FIG. 13, for example, a device 1310 including a multi-protocol I/O interconnect 1301, which in turn includes a multi-protocol switching fabric 1303, may be configured to be interconnected with a multi-protocol apparatus 1300 which also includes a multi-protocol I/O interconnect 1308 and switching fabric 1314. One or more other peripheral devices 1305a, 1305b, . . . 1305n may be interconnected with the I/O interconnect 1301 via one or more corresponding non-protocol-specific ports 1312.

As noted herein, various embodiments of I/O complexes and apparatuses including I/O complexes may be configured to tunnel a multiple protocols across a multi-protocol I/O interconnect in a software-transparent manner or substantially transparent manner. Specific examples of PCIe tunneling techniques will now be described in further detail with reference to FIGS. 14-22.

Figure 14:
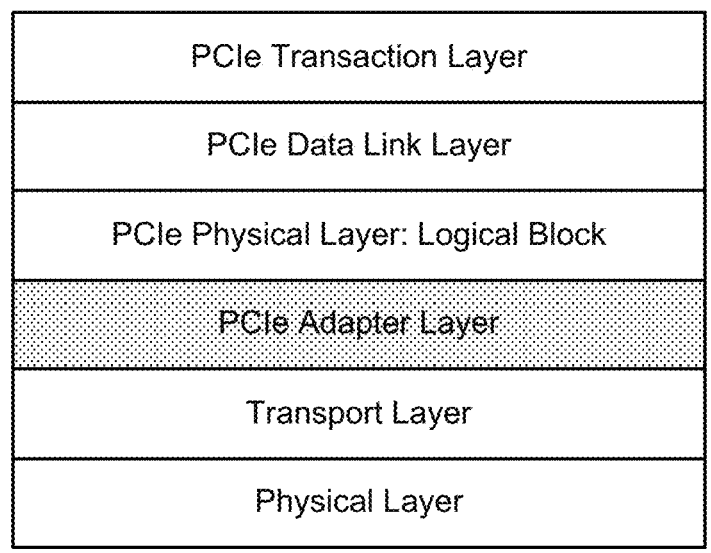
FIG. 14 describes a stack diagram for a multi-protocol I/O interconnect/PCIe adapter, in accordance with various embodiments of the present disclosure.

FIG. 14 shows an example stack diagram highlighting the PCIe/multi-protocol interconnect adapter. As shown, the adapter interfaces the transport layer to the PCIe stack. The PCIe stack may include the PCIe transaction and data link layers, and the logical block of the physical layer, including the logical block link training and status state machine (discussed more fully below).

Figure 15:
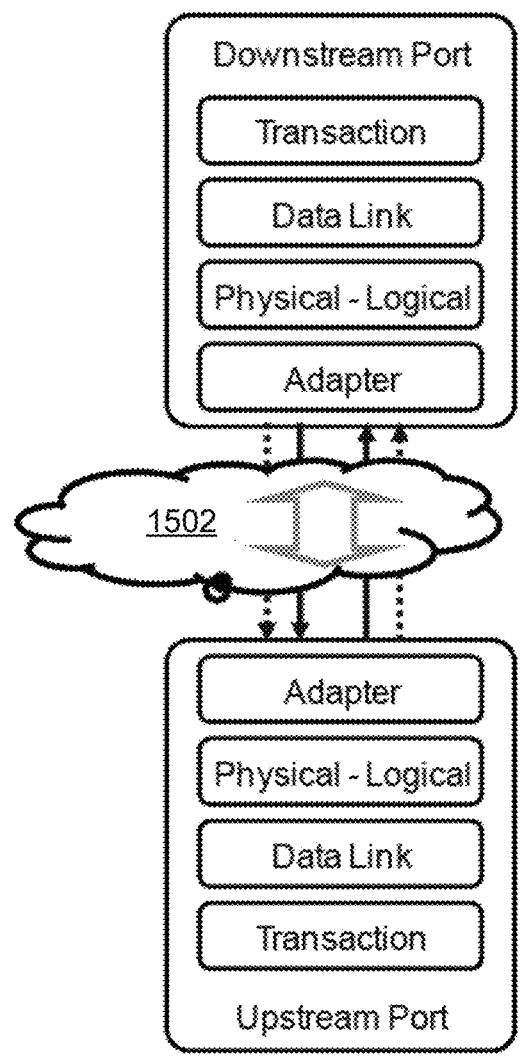
FIG. 15 describes an architecture for mapping a PCIe stream over a multi-protocol switching fabric, in accordance with various embodiments of the present disclosure.
Figure 16:
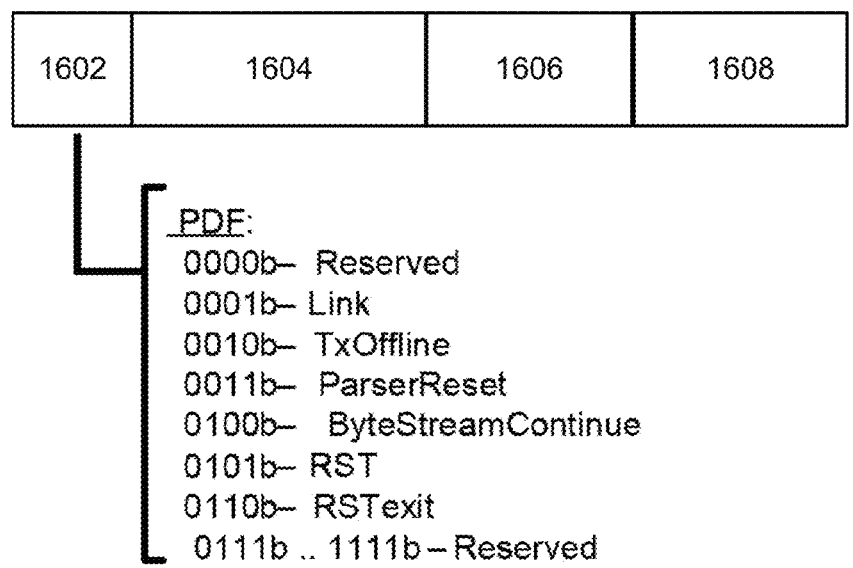
FIG. 16 describes a multi-protocol I/O interconnect packet header, in accordance with various embodiments of the present disclosure.

A multi-protocol I/O interconnect 1502 may be configured to interconnect a PCIe/multi-protocol interconnect adapter representing a downstream PCIe port with another PCIe/multi-protocol interconnect adapter representing an upstream PCIe port, as shown in FIG. 15. As shown, the downstream port may be permitted to be either a switch downstream port or a root port. The upstream port may be permitted to be either a switch upstream port or an endpoint upstream port. A PCIe virtual link may be established between the downstream and upstream ports using a single multi-protocol I/O interconnect path.

In various embodiments, a multi-protocol I/O interconnect may be configured to map the transaction, data link, and physical/logical layers of PCIe, replace the functions of the PCIe physical/electrical layer, and add any necessary translation by means of the PCIe/multi-protocol interconnect adapter. PCIe components may be connected at any level of the multi-protocol I/O interconnect topology. A PCIe adapter may connect a PCIe component (root complex, switch, or endpoint) to the multi-protocol I/O interconnect topology. In various embodiments, a PCIe adapter may represent a single multi-protocol I/O interconnect endpoint regardless of whether it connects to a PCIe switch or a PCIe endpoint.

In various embodiments, the PCIe adapter described herein is a conceptual construct in which a specific implementation is not required. In general, embodiments of the PCIe adapter follow a fused adapter model, an architectural model in which an adapter is physically associated with the associated mapped protocol stack instance, and information exchanged between the mapped protocol instance and the adapter includes information not visible from either element when viewed externally.

As noted earlier, a PCIe/multi-protocol interconnect adapter may use a single path to represent a virtual link between an upstream and a downstream PCIe port. PCIe may define a logical "byte stream" that may undergo segmentation and reassembly to flow through the multi-protocol interconnect layers/fabric, in the form multi-protocol interconnect packets. An example packet header is described in FIG. 16. As shown, the packet header may include a protocol defined field (PDF) 1602, a Hop ID field 1604, a Length field 1606, and a Header Error Control (HEC) field 1608.

The protocol defined field (PDF) 1602 may be used to maintain synchronization between two adapters by replacing certain functionality of the PCIe physical layer, indicating how the receiver may parse the received byte stream, etc. The Hop ID field 1604 may be carried in the header of all packets associated with a path and may be a locally unique identifier for the path. The Length field 1606 field may be binary encoded with a value equal to the number of bytes in the transport layer packet payload. The HEC field 1608 may be configured to protect the packet header. In various embodiments, the HEC field 1608 may include some number of bits (e.g., 8 bits) and may be used to correct single-bit errors in the transport layer packet header.

In various embodiments, the PDF 1602 may be used for byte streams generated and received by the PCIe link training and status state machine (LTSSM). The LTSSM ordered sets may be modified in one or more various ways. For example, when a PCIe link is established over a multi-protocol interconnect, as indicated by the transition from 0b to 1b of a Physical LinkUp signal generated by the LTSSM, the first PCIe byte stream data provided to the protocol transport layer for transmission may be required to indicate "ParserReset." In subsequent transmissions, every time a multi-protocol interconnect packet start also corresponds to the start of a TLP or DLLP, ParserReset" may be required to be indicated. In various embodiments, "ParserReset" may be required to be indicated before all Data Link Layer Retry buffer replays.

In various embodiments, Data Link Layer Retry buffer replays may be required to start with the first retransmitted TLP aligned at the start of a LPK packet, which in turn may cause the "ParserReset" PDF to be used.

In various embodiments, for all cases where a multi-protocol I/O interconnect packet starts with the continuation of a TLP or DLLP started in an earlier multi-protocol I/O interconnect packet, "ByteStreamContinue" may be required to be indicated.

In various embodiments, if the PCIe/multi-protocol interconnect adapter receiver byte stream parser receives a "ParserReset" indication, and is expecting the start of a TLP or DLLP, then parser operation may continue normally. If the parser was not expecting the start of a TLP or DLLP, the parser may be required to terminate the parsing of the TLP or DLLP it was processing and reset itself to start parsing from the start of a new TLP or DLLP. This action may not itself indicate an error condition, and the parser may not indicate a parsing error for the terminated TLP or DLLP.

TxOffline may be used to indicate when the virtual PCIe transmitter is turned off, as on a physical PCIe link with a transmitter in electrical idle. In various embodiments, when a "virtual" electrical idle condition exists, the adapter may be required to indicate this condition by transmitting a multi-protocol interconnect packet with the TxOffline PDF code, initially 10 times at 1 µs (+0%/−50%) intervals and subsequently at 10 ms (+0%/−50%) intervals for as long as the condition continues to exist. The multi-protocol interconnect packet may be required to be transmitted with a 4 byte (1DW) payload where the payload contents are undefined, but receivers may not be required to check the payload length.

RST and RSTexit may be used to indicate when the virtual PCIe fundamental reset is active. In various embodiments, when this condition exists, the downstream port adapter only may transmit a multi-protocol interconnect packet with the RST PDF code, initially 10 times at 1 µs (+0%/−50%) intervals and subsequently at 10 ms (+0%/−50%) intervals for as long as the reset condition continues to exist. The multi-protocol interconnect packet may be required to be transmitted with a 4 byte (1DW) payload, where the payload contents are undefined, but receivers may not be required to check the payload length. The downstream port adapter may be required to not transmit any encapsulated PCIe packets during this time. Once the upstream port adapter receives a multi-protocol interconnect packet with the RST PDF, it may be required to consider the fundamental reset signal to be asserted until it receives RSTexit or some encapsulated PCIe packet.

When a path is established between two PCIe adapters, a virtual PCIe link may be established. The linked condition may be indicated to the PCIe adapters by the transport layer, which may be required to provide a signal to indicate that the adapter has been mapped to a path. To the adapter, this signal may be equivalent to a physical PCIe "presence" detect signal. In various embodiments, when the adapters recognize the existence of the established link, each adapter may be required to indicate to its corresponding PCIe stack that link training be initiated. This may result in the PCIe physical layer logical block initiating PCIe link training, which may in turn result in the PCIe stacks establishing a virtual link across the multi-protocol I/O interconnect.

Figure 17:
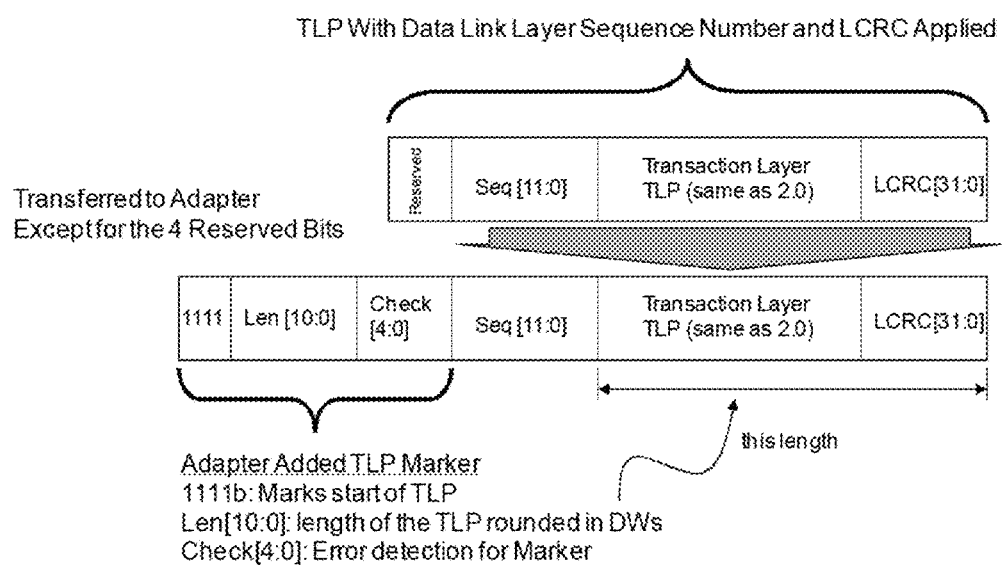
FIG. 17 describes encapsulation of TLPs, in accordance with various embodiments of the present disclosure.

FIG. 17 describes an example encapsulation of TLPs in accordance with various embodiments. In this example, the TLP exchanged with the data link layer may include the sequence number (Seq[11:0]) and link CRC (CRC[31:0]), but may not include the 4 reserved bits preceding the sequence number, which may be required to be prepended by the receiving adapter before passing the received TLP to the data link layer. These 4 bits may be included in the LCRC calculations by both receiver and transmitter data link layers.

As processed by the adapter, a TLP may have one or more of the following prepended:

The first 4 bits may be required to be 1111b.

The following 11 bits may be required to indicate the length of the TLP, including the LCRC but not the sequence number or 4 initial reserved bits, in doubleword-permitted values range from 4 to 1030, which may be encoded 000 0000 0000b (=4DW) to 100 0000 0010b (=1030).

The last 5 bits may be required to implement an error detection code on the 20 bits preceding the TLP:

Check[3:0] may be the CRC calculated using the polynomial $(x4+x+1)$ over the 11 bits of length plus 4 bits for the TLP marker, which may be calculated as follows:

$$Check[0]=L[10]^\wedge L[7]^\wedge L[6]^\wedge L[4]^\wedge L[2]^\wedge L[1]^\wedge L[0]$$

$$Check[1]=L[10]^\wedge L[9]^\wedge L[7]^\wedge L[5]^\wedge L[4]^\wedge L[3]^\wedge L[2]$$

$$Check[2]=L[9]^\wedge L[8]^\wedge L[6]^\wedge L[4]^\wedge L[3]^\wedge L[2]^\wedge L[1]$$

$$Check[3]=L[8]^\wedge L[7]^\wedge L[5]^\wedge L[3]^\wedge L[2]^\wedge L[1]^\wedge L[0]$$

Check[4] may be for overall odd parity to cover the 15 bits. Receivers may be required to identify violations of the rules above and report violations as Receiver Error, and the Adapter may be required to notify the data link and transaction layers of the error. In various embodiments, the adapter may be required to notify the multi-protocol transport/physical layers of the error.

Figure 18:
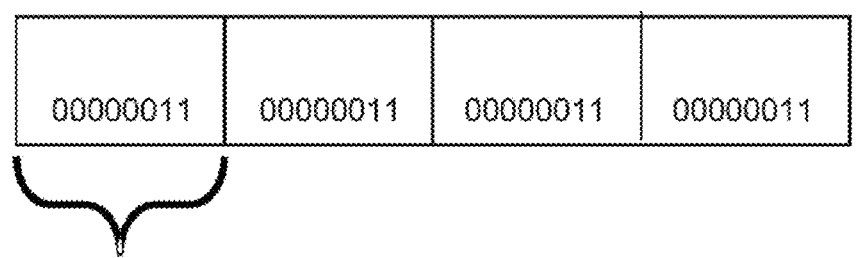
FIG. 18 describes EDB byte stream representation, in accordance with various embodiments of the present disclosure.

For nullified TLPs, the data link layer may invert the LCRC and may be required to provide an indication to the PCIe/multi-protocol I/O interconnect adapter, which may append an EDB "packet," as shown in FIG. 18. The transmitter may be required to transmit the EDB following the nullified TLP without inserting idles or other packet data. In various embodiments, the adapter may be required to report receipt of an EDB to the data link layer such that the data link layer can take the appropriate action.

Transmitters may be permitted to pack multiple TLPs (and DLLPs) into a single multi-protocol I/O interconnect packet. Transmission of TLPs that cross multi-protocol I/O interconnect packet boundaries may be permitted in various embodiments. In various embodiments, transmission of a DLLP that crosses a multi-protocol I/O interconnect packet boundary may not be permitted, as this may allow for simplification of the receiver implementation.

For certain PCIe capabilities, such as Latency Tolerance Reporting (LTR), etc., it may be necessary to account for multi-protocol I/O interconnect fabric latencies.

Figure 19:
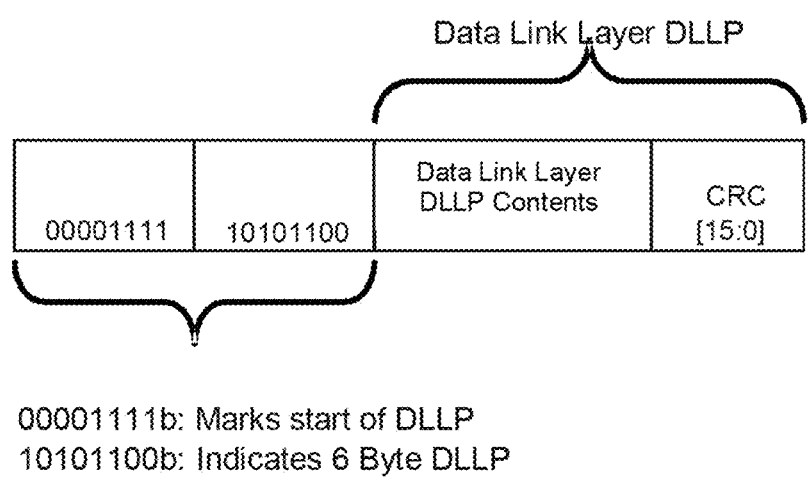
FIG. 19 describes encapsulation of DLLPs, in accordance with various embodiments of the present disclosure.

FIG. 19 describes the encapsulation of DLLPs, in accordance with various embodiments. The DLLP exchanged with the Data Link Layer may include the 4 bytes of DLLP contents plus 2 bytes of DLLP CRC as produced/consumed by the Data Link Layer. In various embodiments, the DLLP may have one or more of the following prepended:

The first byte may be required to be 00001111b.

The second byte may be required to be 10101100b.

In various embodiments, receivers may be required to check both bytes and reject input that does not match. Receivers may be required to identify violations of the rules above and report violations as Receiver Error, and the adapter may be required to notify the data link and transaction layers of the error. In various embodiments, the adapter may be required to notify the transport and physical layers.

The LTSSM may control the actions of the PCIe physical layer logical block. Data (Ordered Sets) generated/consumed by the LTSSM may be modified relative to PCIe as shown below.

The link PDF may be required to be used for all data generated/consumed by the PCIe physical layer logical block. Data generated/consumed by the transaction and data link may be required to be transmitted in separate multi-protocol I/O interconnect packets from data generated/consumed by the PCIe physical layer logical block. Each ordered set may be required to be carried in exactly one multi-protocol I/O interconnect packet. In various embodiments, it may not be permitted to have multiple ordered sets in one multi-protocol I/O interconnect packet or to split an ordered set across multiple multi-protocol I/O interconnect packets.

In various embodiments, only Training Set Ordered Sets (TS) and Electrical Idle Ordered Sets (EIOS) are transmitted over the multi-protocol I/O interconnect. In various embodiments, PCIe Idle data may not be permitted to be transmitted over the multi-protocol I/O interconnect.

Figure 20:
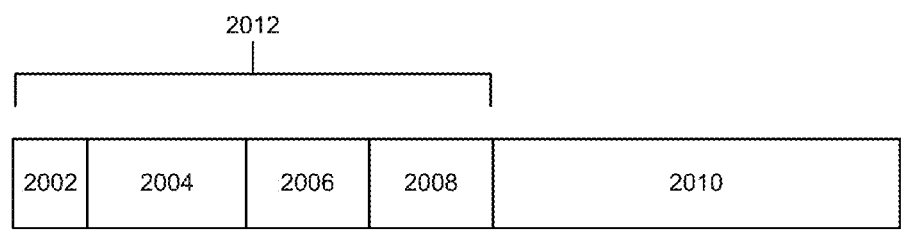
FIG. 20 describes a multi-protocol I/O interconnect packet conveying a PCIe physical layer logical block ordered set along with a packet header, in accordance with various embodiments of the present disclosure.

FIG. 20 describes an example multi-protocol I/O interconnect packet conveying a PCIe physical layer logical block ordered set 2010 along with a packet header 2012. The packet header 2012 may configured similarly to the packet header described herein with reference to FIG. 16. For example, the packet header 2014 may include a PDF 2002, a Hop ID field 2004, a Length field 2006, and a HED field 2008.

In various embodiments, the ordered set 2010 may comprise one Training Set Ordered Sets (TS) or Electrical Idle Ordered Set (EIOS). In various embodiments, the TS may be modified relative to PCI Express as described in *PCI Express Base Specification*, Revision 2.1, Mar. 4, 2009, as shown in Table 1 and the EIOS may be defined as shown in Table 2.

TABLE 1

| Symbol | TS1 | TS2 |
|---|---|---|
| 0 | COM replaced with BCh | =TS1 |
| 1 | Link Number - PAD (when used) replaced by F7h. Data values unchanged except that values F0-FFh are reserved. | =TS1 |
| 2 | Lane Number - PAD (when used) replaced by F7h. Data values unchanged. | =TS1 |
| 3 | N_FTS must be set to 00h | =TS1 |
| 4 | Data Rate Identifier - no change in permitted values When used to indicate a preferred de-emphasis, this value has no effect and must be ignored by the receiver. | =TS1 |
| 5 | Training Control; bit 0 - Hot Reset - no change bit 1 Disable Link- no change bit 2 - Loopback - no change bit 3 - Disable Scrambling - no change; no effect bit 4 - Compliance Receive - must be transmitted as 0 and ignored by receiver bits 5-7 - reserved - must be transmitted as 0 and ignored by receiver | =TS1 |
| 6-15 | TS1 Identifier; 4Ah | TS2 identifier: 45h |

TABLE 2

| Symbol | EIOS |
|---|---|
| 0 | COM replaced with BCh |
| 1-3 | IDL replaced with 7Ch |

In various embodiments, EIEOS, FTS, and SKP sets may not be permitted to be transmitted over the multi-protocol I/O interconnect.

In various embodiments, the "virtual" Electrical Idle condition that exists when the PCIe physical layer logical block has idled its transmitter may be required to be indicated by transmitting a multi-protocol I/O interconnect packet with the TxOffline PDF code as described elsewhere herein.

In various embodiments, when the multi-protocol I/O interconnect link is in a power managed state, the PCIe/multi-protocol I/O interconnect adapter may be required to not cause the multi-protocol I/O interconnect link to exit the power managed state except to send TLP or, in some cases, DLLP traffic, depending on the PCIe power state.

The PCIe physical layer LTSSM may be the principle element of the PCIe physical layer that is reused when PCIe is mapped over the multi-protocol I/O interconnect described herein. In various embodiments, a number of LTSSM mechanisms may be unchanged relative to conventional PCI Express described, for example, in *PCI Express Base Specification*, Revision 2.1, published by the PCI Special Interest Group (PCI-SIG), dated Mar. 4, 2009. There are number of differences, however.

For link negotiation and recovery, PCIe controllers may expect Training Sets (TS) to be received consecutively, and many controllers may assume a failure of the link if there is a long gap following reception of some TS, because the PCIe LTSSM has a requirement of some minimal number of consecutive TS to be received without error, and the "missing" TS are considered errors. For various embodiments of multi-protocol I/O interconnect described herein, however, tunneling may not ensure consecutive TS, which may be because if there are several protocols on the same multi-protocol I/O interconnect link, there may be gaps between the multi-protocol I/O interconnect PCIe packets, and therefore, also between TS packets. If this is not corrected by the adapter, the impact may be that in many cases of link negotiation or recovery (after L1) the link may go to Detect State, which may cause a logical link down and loss of PCIe connection.

To avoid this, the adapter may duplicate TS packets while receiving the packets from the multi-protocol I/O interconnect such that each TS is duplicated until the next TS packet, with additional logic to stop the duplication if the tunneled PCIe link is read to exit to L0. Note that the LTSSM may require certain numbers of TS to be received in order for certain transitions to occur, so when the adapter repeats TS it may consider the potential effects of the repeated TS.

In various embodiments, it may be required that the PCIe physical layer data scrambling not be applied. The Disable Scrambling in the Training Control field of the Training Set (TS) may have no effect.

In various embodiments, it may be required that Lane Polarity Inversion not be used such that all bits must be transmitted with normal polarity.

In various embodiments, elements relating to the electrical control of a physical PCIe link may be required to be ignored.

PCIe L0s entry rules may be required to be followed. In various embodiments, when the PCIe "transmitter" is placed into L0s, this must be indicated to the protocol transport layer for that layer's consideration in determining the appropriate link state for the multi-protocol I/O interconnect link. In various embodiments, it may be required that the multi-protocol I/O interconnect link state not be reflected back to the PCIe adapter, and from the PCIe "receiver" point of view, L0s not be used.

In various embodiments, the SKPs are not passed, so in implementation where an existing PCIe controller is used, it may be necessary for the adapter to send SKPs under certain circumstances, particularly when L0s is used. If this is not done, the PCIe controller may exit L0sRx and go to the Recovery State. In some embodiments, the adapter may send SKPs to the PCIe controller after each Rx EI desertion. In various embodiments, the port may instead indicate that L0s are not supported.

In various embodiments, all ordered sets generated by the physical layer logical block may be required to be metered to an approximate rate of 1 LPK packet per 1 μs period.

Figure 21:
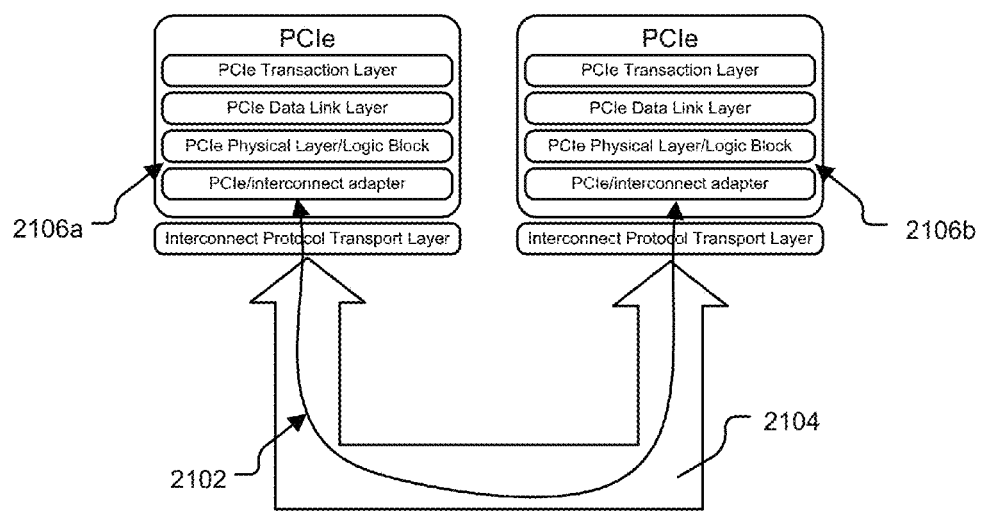
FIG. 21 describes adapter-to-adapter bandwidth measurement, in accordance with various embodiments of the present disclosure.

FIG. 21 describes how the bandwidth associated with a path 2102 over a multi-protocol I/O interconnect 2104 between a PCIe upstream adapter 2106a and a PCIe downstream adapter 2106b can be measured and controlled at various points. The adapters 2106a, 2106b may each include an internal bandwidth (data path). In various embodiments, the adapters 2106a, 2106b may implement different bandwidth capabilities. For various embodiments of the multi-protocol I/O interconnect/switching fabric described herein, link width and speed mechanisms may be applied such that the bandwidth allocated to the PCIe link 2102 over the multi-protocol I/O interconnect 2104 may be accurately reflected in the PCIe reporting mechanisms. PCIe mechanisms for software notification of link bandwidth changes may be used to indicate changes to multi-protocol I/O interconnect bandwidth allocated to PCIe.

The speeds and widths indicated in Supported Link Speeds and Maximum Link Width registers in a Link Capabilities register may be required to reflect the capabilities of the implemented PCIe map. In various embodiments, the maximum bandwidth supported may be required to be equal or exceed the bandwidth achievable at the reported maximum width and speed.

The values reported in Negotiated Link Width and Current Link Speed registers in the Link Status register may be required to yield a bandwidth equal to or less than the actual bandwidth allocated to a mapped PCIe link.

When PCIe mechanisms are used to limit the link bandwidth, the adapter may be required to indicate to PCIe system software that the link bandwidth has been reduced. In various embodiments, it may not be required for the adapter to reduce the actual bandwidth provided. In various embodiments, it may be permitted for the adapter to indicate bandwidth changes to the transport layer and for the transport layer to modify the path bandwidth allocated.

In various embodiments, a multi-protocol I/O interconnect link power state may be required to comprehend all users of the multi-protocol I/O interconnect link. PCIe link(s) using a given multi-protocol I/O interconnect link may present a "virtual link power state," which may be used by the transport layer as a "vote" to determine the multi-protocol I/O interconnect link power state(s) that would be appropriate. PCIe link power negotiation mechanisms, using the DLLPs and TLPs specified in the PCI Express standard described in *PCI Express Base Specification*, Revision 2.1, published by the PCI Special Interest Group (PCI-SIG), dated Mar. 4, 2009.

Figure 22:
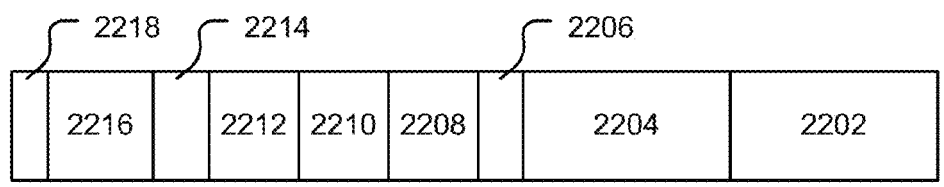
FIG. 22 describes an adapter capability structure for a PCIe upstream or downstream adapter, in accordance with various embodiments of the present disclosure.

An example of the adapter capability structure for a PCIe upstream or downstream adapter, in accordance with various embodiments, is described in FIG. 22. A Next Capability Pointer 2202 may be a register defining the doubleword index of the next capability register set in the port configuration space. In various embodiments, the Next Capability Pointer 2202 may be set to 00h if the adapter capability register set is the final capability set in the linked list of capability register sets in the port configuration space.

A Capability ID 2204 may be a register indicating the start of the adapter capability register set. In various embodiments, the Capability ID 2204 may contain the value 04h to indicate the start of the adapter capability register set.

The adapter capability structure may include one or more of various other configuration registers including, for example, a Link Up Flag 2206 to indicate whether the PCIe virtual link is up or down, a Transmitter Electrical Idle status bit 2208 to indicate an electrical idle state, a Receiver Electrical Idle status bit 2210 to indicate whether the receiver is in electrical idle state, a Reset Flag 2212 to indicate whether the PCIe domain is in reset, a Rate field 2214 to encode the link signaling rate of the virtual PCIe link, a Link Power Management State field 2216 to encode the power management state of the virtual link, and a PCIe LTSSM 2218. The adapter capability structure may include an Enable Flag 2220 which may be set to start and stop the transmission and reception of packets on the PCIe virtual link.

Figure 23:
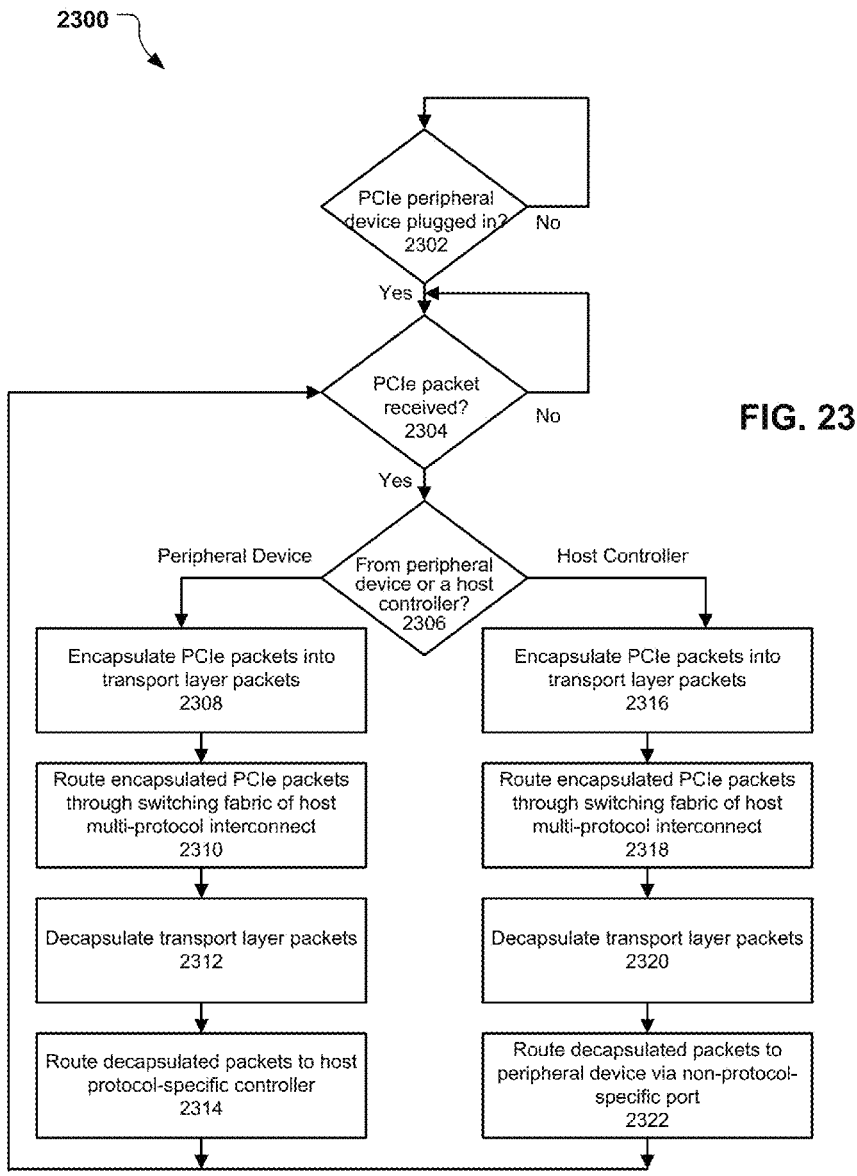
FIG. 23 is a flow diagram of a method for operating a computer apparatus including a multi-protocol tunneling I/O interconnect, in accordance with various embodiments of the present disclosure.

FIG. 23 illustrates an example method for operating a computer apparatus including a multi-protocol tunneling I/O interconnect, in accordance with various embodiments of the present disclosure. The method 2300 may include one or more functions, operations, or actions as is illustrated by blocks 2302-2322.

Processing for the method 2300 may start with block 2302 by determining whether a PCIe peripheral device has been plugged into a non-protocol-specific port of a computer apparatus including a multi-protocol tunneling I/O interconnect. Plugging may refer to a peripheral device being directly coupled with the non-protocol-specific port and/or a target peripheral device being directly coupled to some other peripheral device directly coupled with the non-protocol-specific port. In the latter embodiments, one or more other peripheral devices may be operatively disposed between the target peripheral device and the non-protocol-specific port. If no peripheral device has been plugged, then processing in block 2302 may repeat. In various embodiments, the computer apparatus may be configured to issue an interrupt signal indicating when a peripheral device has been plugged (e.g., hot-plugged).

Processing for the method 2300 may proceed to block 2304 by determining whether a PCIe data packet has been received. If no data packet has been received, then processing in block 2304 may repeat. In various embodiments, a PCIe data packet may be received from the PCIe peripheral device or from within the computer apparatus. In various embodiments, PCIe data packets within the computer apparatus may be received by the multi-protocol tunneling I/O interconnect from a PCIe protocol-specific controller ("host protocol-specific controller") of the computer apparatus.

Processing for the method 2300 may proceed to block 2306 by determining whether the PCIe data packet was received from the PCIe peripheral device or from a host protocol-specific controller. If no data packet has been received, then processing in block 2306 may repeat.

If the PCIe data packet was received from the PCIe peripheral device, processing for the method 2300 may proceed to block 2308 by encapsulating PCIe packets into first transport layer packets configured to be routed through the switching fabric of the I/O interconnect. In various embodiments, packets of a second protocol, different from PCIe protocol, may also be encapsulated into second transport layer packets for routing through the switching fabric.

Processing for the method 2300 may proceed to block 2310 by simultaneously routing the first and second transport layer packets through the switching fabric of the I/O interconnect.

Processing for the method 2300 may proceed to block 2312 by decapsulating the transport layer packets. In various embodiments, decapsulation may be performed an adapter port of a switch of the switching fabric.

Processing for the method 2300 may proceed to block 2314 by routing the decapsulated packets to different host protocol-specific controllers of the computer apparatus.

If the data packet was received from the peripheral device, processing for the method 2300 may proceed from block 2306 to block 2316 by encapsulating PCIe packets into first transport layer packets configured to be routed through the switching fabric of the I/O interconnect. In various embodiments, packets of a second protocol, different from PCIe protocol, may also be encapsulated into second transport layer packets for routing through the switching fabric.

Processing for the method 2300 may proceed to block 2318 by simultaneously routing the first and second transport layer packets through the switching fabric of the I/O interconnect.

Processing for the method 2300 may proceed to block 2320 by decapsulating the transport layer packets. In various embodiments, decapsulation may be performed an adapter port of a switch of the switching fabric.

Processing for the method 2300 may proceed to block 2322 by routing the decapsulated packets to a peripheral device via a non-protocol-specific port of the computer apparatus.

Figure 24:
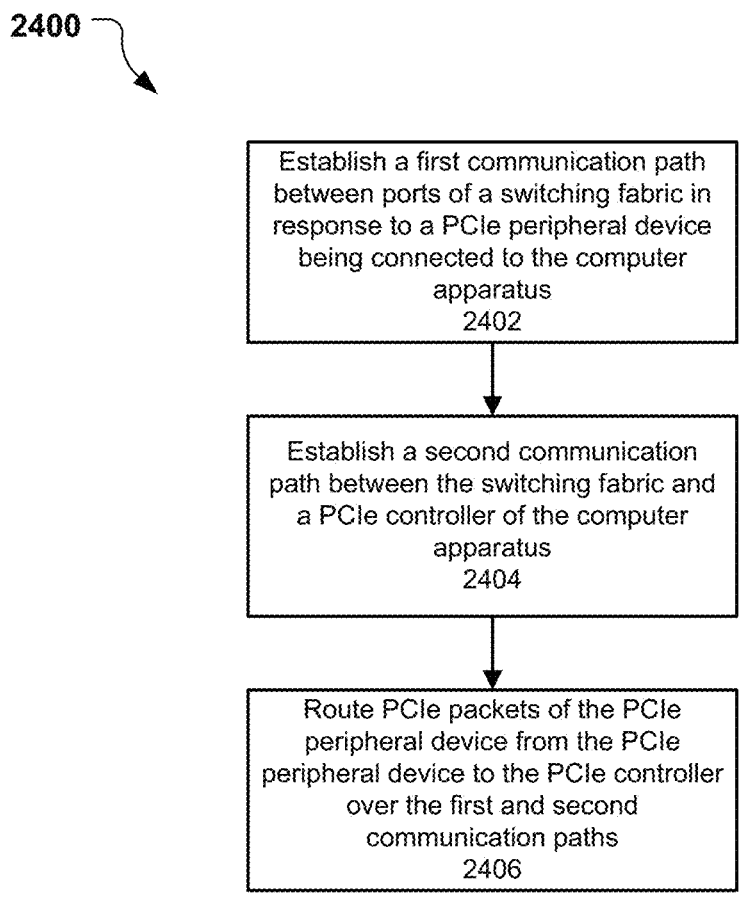
FIG. 24 is a flow diagram of a method for hot-plugging a computer apparatus including a multi-protocol tunneling I/O interconnect, in accordance with various embodiments of the present disclosure.

FIG. 24 is a flow diagram of an example method for hot-plugging a computer apparatus including a multi-protocol tunneling I/O interconnect, in accordance with various embodiments of the present disclosure. The method 2400 may include one or more functions, operations, or actions as is illustrated by blocks 2402-2406.

Processing for the method 2400 may start with block 2402 by establishing a first communication path between ports of a switching fabric of a multi-protocol I/O interconnect of a computer apparatus in response to a PCIe peripheral device being connected to the computer apparatus. In various embodiments, the PCIe peripheral device may be connected to the computer apparatus by a plug or similar connector. In various embodiments, a PCIe peripheral device may be connected to the computer apparatus directly at a non-protocol-specific port of the computer apparatus and/or a target peripheral device may be directly coupled to some other peripheral device directly coupled with the non-protocol-specific port. In the latter embodiments, one or more other peripheral devices may be operatively disposed between the target peripheral device and the non-protocol-specific port.

In various embodiments, establishing the first communication path may be performed based at least in part on a first hot plug indication sent by the multi-protocol I/O interconnect to an I/O driver of the computing apparatus.

Processing for the method 2400 may proceed to block 2404 by establishing a second communication path between the switching fabric and a PCIe controller of the computer apparatus.

In various embodiments, establishing the second communication path may be performed based at least in part on a second hot plug indication sent by the PCIe controller to a respective protocol-specific driver.

Processing for the method 2400 may proceed to block 2406 by routing, by the multi-protocol I/O interconnect, PCIe packets of the PCIe peripheral device from the PCIe peripheral device to the PCIe controller over the first and second communication paths.

In various embodiments, the method 2400 may further comprise routing, by the multi-protocol I/O interconnect, packets of a second protocol of a second peripheral device from the second peripheral device to a second protocol-specific controller. Routing of the packets of the second protocol may include routing the packets of the second protocol over the first communication path. Routing of the PCIe packets and the routing of the packets of the second protocol may be performed simultaneously, as described herein. The second protocol may be the same or different than a PCIe protocol.

In various embodiments, one or more of the functions, operations, or actions as is illustrated by blocks 2402-2406 may be performed in conjunction with one or more of the functions, operations, or actions as illustrated in FIG. 23.

Figure 25:
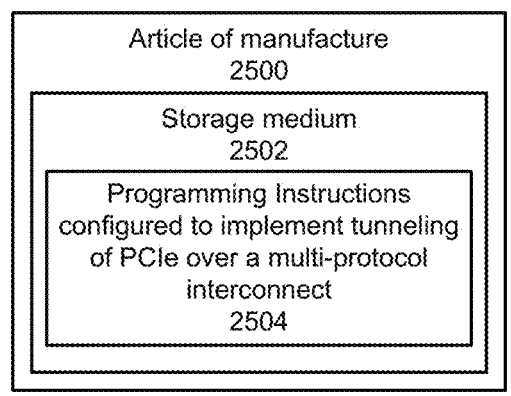
FIG. 25 describes an article of manufacture having programming instructions configured to cause an apparatus to practice some or all aspects of multi-protocol tunneling (of the methods of FIGS. 23-24, for example), in accordance with embodiments of the present disclosure.

In various embodiments, an article of manufacture may be employed to implement one or more methods as disclosed herein. FIG. 25 describes an example article of manufacture 2500. As shown, the article of manufacture 2500 may include a computer-readable non-transitory storage medium 2502 and a storage medium 2502. The storage medium 2502 may include programming instructions 2504 configured to cause an apparatus to practice some or all aspects of multi-protocol tunneling, in accordance with embodiments of the present disclosure.

The storage medium 2502 may represent a broad range of persistent storage medium known in the art, including but not limited to flash memory, optical disks or magnetic disks. The programming instructions 2504, in particular, may enable an apparatus, in response to their execution by the apparatus, to perform various operations described herein. For example, the storage medium 2502 may include programming instructions 2504 configured to cause an apparatus to practice some or all aspects of multi-protocol tunneling of the methods of FIGS. 23-24, for example, in accordance with embodiments of the present disclosure.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A multi-protocol input-output (I/O) interconnect comprising:
a first port; and
a peripheral component interconnect express (PCIe) device associated with the first port of the multi-protocol I/O interconnect, wherein the PCIe device includes:
a PCIe adapter having logic to establish a PCIe virtual link between the first port and a second port, using a multi-protocol I/O interconnect path between the first and second ports, wherein the PCIe adapter is to indicate a bandwidth associated with the interconnect path to the PCIe device.

2. The multi-protocol I/O interconnect of claim 1, wherein the multi-protocol I/O interconnect is associated with a computing apparatus.

3. The multi-protocol I/O interconnect of claim 1, wherein the PCIe device is operable with a transport layer to provide indication to the PCIe adapter that the multi-protocol I/O interconnect path between the first and second ports is established.

4. The multi-protocol I/O interconnect of claim 3, wherein the PCIe adapter is to indicate to the PCIe device that the bandwidth associated with the interconnect path has been changed, wherein the transport layer is to modify the path bandwidth in response to the indication.

5. The multi-protocol I/O interconnect of claim 1, wherein the PCIe adapter is to indicate to the PCIe device that a virtual link training is to be initiated.

6. The multi-protocol I/O interconnect of claim 5, wherein the PCIe device further includes a PCIe physical layer logical block to initiate the virtual link training in response to the indication from the PCIe adapter.

7. The multi-protocol I/O interconnect of claim 6, wherein the PCIe device is operable with a PCIe transaction layer and PCIe data link layer.

8. The multi-protocol I/O interconnect of claim 7, wherein the PCIe device is to form a multi-protocol interconnect packet to be transmitted via the PCIe virtual link from the first port to the second port.

9. The multi-protocol I/O interconnect of claim 8, wherein the multi-protocol interconnect packet includes a packet header having a protocol defined field (PDF) to indicate maintenance of synchronization between the PCIe adapter and another PCIe adapter associated with the second port.

10. A method, comprising:
receiving, by a peripheral component interconnect express (PCIe) device associated with a first port of a multi-protocol I/O interconnect of a computing apparatus, an indication that a multi-protocol I/O interconnect path between the first port of the multi-protocol I/O interconnect and a second port is established;
initiating, by the PCIe device, a training of a PCIe virtual link in response to receiving the indication, based on the established multi-protocol I/O interconnect path, including forming a multi-protocol interconnect packet to be transmitted via the PCIe virtual link from the first port to the second port, wherein the multi-protocol interconnect packet includes a packet header that indicates maintenance of synchronization between the first and second ports; and
establishing, by the PCIe device, the PCIe virtual link, based on a result of the training.

11. A computer system, comprising:
a processor;
a memory coupled with the processor; and
a multi-protocol input-output (I/O) interconnect coupled with the processor and memory that includes:
a first port; and
a peripheral component interconnect express (PCIe) device associated with the first port of the multi-protocol I/O interconnect, wherein the PCIe device includes a PCIe adapter having logic to establish a PCIe virtual link between the first port and a second port, using a multi-protocol I/O interconnect path between the first and second ports, wherein the PCIe adapter logic is to indicate a bandwidth associated with the interconnect path to the PCIe device.

12. The computer system of claim 11, wherein the multi-protocol I/O interconnect is associated with a computing apparatus.

13. The computer system of claim 11, wherein the PCIe device is operable with a transport layer to provide indication to the PCIe adapter that the multi-protocol I/O interconnect path between the first and second ports is established.

14. The computer system of claim 11, wherein the PCIe adapter logic is to indicate to the PCIe device that a virtual link training is to be initiated.

15. The computer system of claim 14, wherein the PCIe device is operable with a PCIe physical layer logical block to initiate the virtual link training in response to the indication from the PCIe adapter.

16. The computer system of claim 15, wherein the PCIe device is operable with a PCIe transaction layer and PCIe data link layer.

17. The computer system of claim 15, wherein the PCIe device is to form a multi-protocol interconnect packet to be transmitted via the PCIe virtual link from the first port to the second port.

* * * * *